(12) United States Patent
Ebert et al.

(10) Patent No.: US 12,545,857 B2
(45) Date of Patent: Feb. 10, 2026

(54) AMPHIPHILIC ALKOXYLATED POLYAMINES AND THEIR USES

(71) Applicant: The Procter & Gamble Company, Cincinnati, OH (US)

(72) Inventors: Sophia Rosa Ebert, Mannheim (DE); Joerg Nieberle, Ludwigshafen (DE); Ouidad Benlahmar, Mannheim (DE); Catharina Wohlmuth, Ludwigshafen (DE); Susanne Carina Engert, Ludwigshafen am Rhein (DE); Guido Vandermeulen, Ludwigshafen (DE); Holger Tuerk, Ludwigshafen am Rhein (DE); Frank Huelskoetter, Birkenheide (DE); Gang Si, Newcastle upon Tyne (GB); Katarzyna Gorczynska-Costello, Newcastle upon Tyne (GB); Pieter Jan Maria Saveyn, Brussels (BE); Natalia Stergiopoulou, Brussels (BE)

(73) Assignee: The Procter & Gamble Company, Cincinnati, OH (US)

( * ) Notice: Subject to any disclaimer, the term of this patent is extended or adjusted under 35 U.S.C. 154(b) by 359 days.

(21) Appl. No.: 18/338,406

(22) Filed: Jun. 21, 2023

(65) Prior Publication Data
US 2024/0174950 A1    May 30, 2024

Related U.S. Application Data

(63) Continuation of application No. PCT/EP2021/087021, filed on Dec. 21, 2021.

(30) Foreign Application Priority Data

| Dec. 23, 2020 | (EP) | 20216952 |
| Dec. 23, 2020 | (EP) | 20217099 |
| May 31, 2021 | (EP) | 21176904 |
| May 31, 2021 | (EP) | 21176906 |

(51) Int. Cl.
*C11D 3/00*    (2006.01)
*C11D 3/30*    (2006.01)

(52) U.S. Cl.
CPC ................. *C11D 3/30* (2013.01)

(58) Field of Classification Search
CPC ......... C11D 3/30; C11D 3/3723; C11D 3/386; C08G 73/0226; C08G 73/0206; C08G 63/664; C08G 63/6852; C08G 65/2624; C08G 73/02; C08G 73/024
USPC .......................................................... 510/276
See application file for complete search history.

(56) References Cited

U.S. PATENT DOCUMENTS

| 6,583,213 B1 | 6/2003 | Fawkes | |
| 2015/0057211 A1* | 2/2015 | Hulskotter | C11D 1/00 510/276 |
| 2015/0122742 A1 | 5/2015 | Hilfiger et al. | |
| 2015/0275144 A1* | 10/2015 | Hulskotter | C11D 1/42 510/360 |
| 2019/0010426 A1 | 1/2019 | Scialla | |
| 2020/0392286 A1 | 12/2020 | Okkel | |

FOREIGN PATENT DOCUMENTS

| CA | 2921470 A1 | 3/2015 | |
| CN | 1239984 A | 12/1999 | |
| CN | 1705736 A | 12/2005 | |
| JP | 7025993 B2 | 2/2022 | |
| WO | WO 2015028191 A1 * | 3/2015 | ......... C08G 65/2624 |
| WO | 2017011733 A1 | 1/2017 | |
| WO | 2017196763 A1 | 11/2017 | |
| WO | 2020083680 A1 | 4/2020 | |
| WO | 2021165468 A1 | 8/2021 | |

OTHER PUBLICATIONS

STIC Search Report dated Jun. 29, 2025.*
PCT Search Report and Written Opinion for PCT/EP2021/087021 dated Apr. 11, 2022, 13 pages.

* cited by examiner

*Primary Examiner* — Eisa B Elhilo
(74) *Attorney, Agent, or Firm* — Abigail O. Idokogi; Carrie Schwartz

(57) ABSTRACT

A novel alkoxylated polyamines obtainable by a process including the steps a) to d) and having amphiphilic properties. According to step a), a polyamine containing up to 10 amine-groups as such is reacted with a first alkylene oxide (AO1) in order to obtain a first intermediate (I1). Said first intermediate (I1) is reacted with a lactone and/or a hydroxy carbon acid in step b) in order to obtain a second intermediate (I2) followed by step c), wherein said second intermediate (I2) is reacted optionally with alkylene oxide in order to obtain a third intermediate (I3). Afterwards, said third intermediate (I3) is reacted in optional step d) with a second alkylene oxide (AO2) in order to obtain the novel alkoxylated polyamines. The alkoxylated polyamines may also be included in cleaning compositions and/or in fabric and home care products, and the compositions or products as such.

20 Claims, No Drawings

AMPHIPHILIC ALKOXYLATED POLYAMINES AND THEIR USES

The present invention relates to novel alkoxylated alkoxylated polyamines obtainable by a process comprising the steps a) to d) and having amphiphilic properties. According to step a), a polyamine as such is reacted with a first alkylene oxide (AO1) in order to obtain a first intermediate (I1). Said first intermediate (I1) is reacted with a lactone and/or a hydroxy carbon acid in step b) in order to obtain a second intermediate (I2) followed by step c), wherein said second intermediate (I2) is reacted with ethylene oxide in order to obtain a third intermediate (I3). Afterwards, said third intermediate (I3) is reacted optionally in step d) with a second alkylene oxide (AO2) in order to obtain the novel alkoxylated polyamines. The present invention further relates to a process as such for preparing such alkoxylated polyamines as well as to the use of such compounds within, for example, cleaning compositions and/or in fabric and home care products. Furthermore, the present invention also relates to those compositions or products as such.

Due to the climate change, one of the most important targets of the D&C industry today is to lower significantly the $CO_2$ emission per wash, by improving cold water conditions. Another important target of the D&C industry is the need for biodegradable polymers, to improve the sustainability of the laundry formulations and to avoid the accumulation of non-degradable polymers in the ecosystem. Although the technical hurdle is quite big to improve cold water cleaning performance, especially for the class of oily and fatty stains, amphiphilic alkoxylated polyamines, especially the ones based on polyalkylene imines like polyethylene imines (PEI), are already known in the literature to be able to contribute to oily/fatty soil removal at such conditions. However, those structures are not biodegradable.

WO 2020/187648 also relates to polyalkoxylated polyalkylene imines or alkoxylated polyamines according to a general formula (I). The compounds described therein may be employed within, for example, cosmetic formulations. However, the specific compounds disclosed within WO 2020/187648 differ from the respective compounds of the present invention. Since the substituents of WO 2020/187648 do not comprise any fragments based on lactones and/or hydroxy carbon acids.

WO 95/32272 describes ethoxylated and/or propoxylated polyalkylene amine polymers to boost soil dispersing performance, wherein said polymers have an average ethoxylation/propoxylation of from 0.5 to 10 per nitrogen.

An object of the present invention is to provide novel compounds based on a polyamine backbone. Furthermore, those novel compounds can have beneficial properties when being employed within compositions in respect of their biodegradability.

An object is achieved by an alkoxylated polyamine comprising up to 10, preferably up to 8, more preferably up to 6, most preferably up to 5 such as 4, 3 or 2 amine-groups obtainable by a process comprising the steps a) to c) and optional step d) as follows:

a) reaction of i) at least one polyamine comprising up to 10, preferably up to 8, more preferably up to 6, most preferably up to 5 amine-groups with ii) at least one first alkylene oxide (AO1), wherein 0.25 to 7.0 mol of alkylene oxide (AO1) is employed per mol of NH-functionality of of polyamine, in order to obtain a first intermediate (I1),
b) reaction of the first intermediate (I1) with at least one lactone and/or at least one hydroxy carbon acid, wherein 0.25 to 10 mol of lactone and/or of hydroxy carbon acid is employed per mol of NH-functionality of polyamine (as employed in step a)), in order to obtain a second intermediate (I2),
c) reaction of the second intermediate (I2) with at least one second alkylene oxide (AO2), wherein at least 1 mol of alkylene oxide (AO2) is employed per mol of NH-functionality of polyamine (as employed in step a)), in order to obtain the alkoxylated polyamine or in case optional step d) is employed—a third intermediate (I3),
d) optional reaction of the third intermediate (I3) with at least one second alkylene oxide (AO2), wherein at least 1 mol of alkylene oxide (AO2) is employed per mol of NH-functionality of polyamine (as employed in step a)), in order to obtain the alkoxylated polyamine, and wherein the second alkylene oxide (AO2) in this step is different to ethylene oxide in case only one second alkylene oxide (AO2) is employed in step d), wherein the alkylene oxide AO1 and/or AO2 is chosen such that at least 10, preferably at least 20, more preferably at least 30, more preferably at least 40, most preferably at least 50 weight percent of the total amount of moieties in the alkoxylated polyamine stemming from alkylene oxides (i.e. from AO1 and AO2) originates from C3 and/or C4-alkylene oxides, and wherein the total amount of alkylene oxide employed is from 0,5, preferably from 1, and up to 25, more preferably up to 20, even more preferably up to 17, and most preferably up to 15 mol per NH-functionality of polyamine (i.e. the polyamine as employed in step a).

The alkoxylated compounds may be used in cleaning compositions. They lead to at least comparable and preferably even improved cleaning performance of said composition, for example in respect of removing fat and/or oil, compared to corresponding alkoxylated compounds according to the prior art. Beyond that, the alkoxylated compounds lead to an improved biodegradability when being employed within compositions, for example, within cleaning compositions.

An advantage of the alkoxylated compounds can be seen in their amphiphilic properties, especially due to the employment of higher alkylene oxides than ethylene oxide within step d) of the inventive process. The compounds of the present invention combine good biodegradability properties with amphiphilic properties.

Another advantage can be seen within the respective detergent formulations containing the inventive compounds, for example, in liquid and solid (powder) formulations containing at least one surfactant and the inventive compound, preferably with focus on laundry formulations and manual dish wash formulations with main focus on liquid laundry and liquid manual dish wash formulations, and with very specifically focus on liquid laundry formulations and single mono doses for laundry, containing at least one anionic surfactant, water and the inventive compound.

For the purposes of the present invention, definitions such as $C_1$-$C_{22}$-alkyl, as defined below for, for example, the radical $R^2$ in formula (IIa), mean that this substituent (radical) is an alkyl radical having from 1 to 22 carbon atoms. The alkyl radical can be either linear or branched or optionally cyclic. Alkyl radicals which have both a cyclic component and a linear component likewise come within this definition. The same applies to other alkyl radicals such as a $C_1$-$C_4$-alkyl radical. Examples of alkyl radicals are methyl, ethyl, n-propyl, sec-propyl, n-butyl, sec-butyl, isobutyl, 2-ethylhexyl, tert-butyl (tert-Bu/t-Bu), pentyl, hexyl, heptyl, cyclohexyl, octyl, nonyl, decyl or dodecyl.

The term "$C_2$-$C_{22}$-alkylene" as used herein refers to a saturated, divalent straight chain or branched hydrocarbon chains of 2, 3, 4, 5, 6, 10, 12 or up to 22 carbon atoms, examples including ethane-1,2-diyl ("ethylene"), propane-1,3-diyl, propane-1,2-diyl, 2-methylpropane-1,2-diyl, 2,2-dimethylpropane-1,3-diyl, butane-1,4-diyl, butane-1,3-diyl (=1-methylpropane-1,3-diyl), butane-1,2-diyl ("1,2-butylene"), butane-2,3-diyl, 2-methyl-butan-1,3-diyl, 3-methyl-butan-1,3-diyl (=1,1-dimethylpropane-1,3-diyl), pentane-1,4-diyl, pentane-1,5-diyl, pentane-2,5-diyl, 2-methylpentane-2,5-diyl (=1,1-dimethylbutane-1,3-diyl) and hexane-1,6-diyl.

The term "$C_5$-$C_{10}$-cycloalkylene" as used herein refers to saturated, divalent hydrocarbons of 5, 6, 7, 8, 9 or 10 carbon atoms wherein all or at least a part of the respective number of carbon atoms form a cycle (ring). In case not all of the respective number of carbon atoms form a cycle, such remaining carbon atoms (i. e. those carbon atoms not forming a cycle) form a methane-1,1-diyl ("methylene") fragment or an ethane-1,2-diyl ("ethylene") fragment of the respective $C_5$-$C_{10}$-cycloalkylene radicals. One of the two valencies of said respective methylene or ethylene fragments is bound to a neighbouring nitrogen atom within general formula (I), whereas the second valency of said fragments is bound to the cyclic fragment of said $C_5$-$C_{10}$-cycloalkylene radical.

Expressed in other words, a $C_5$-$C_{10}$-cycloalkylene radical may comprise, in addition to its cyclic fragment, also some non-cyclic fragments building a bridge or a linker of the cyclic fragment of the $C_5$-$C_{10}$-cycloalkylene radical to the neighbouring nitrogen atom within general formula (I). The number of such carbon linker atoms is usually not more than 3, preferably 1 or 2. For example, a $C_7$-cycloalkylene radical may contain one $C_6$-cycle and one $C_1$-linker.

The respective hydrocarbon cycle itself may be unsubstituted or at least monosubstituted by $C_1$-$C_3$-alkyl. It has to be noted that the carbon atoms of the respective $C_1$-$C_3$-alkyl substituents are not considered for determination of the number of carbon atoms of the $C_5$-$C_{10}$-cycloalkylene radical. In contrast to that, the number of carbon atoms of such a $C_5$-$C_{10}$-cycloalkylene radical is solely determined without any substituents, but only by the number of carbon atoms of the cyclic fragment and optionally present carbon linker atoms (methylene or ethylene fragments).

Examples for $C_5$-$C_{10}$-cycloalkylene include cyclopentane-1,2-diyl, cyclohexane-1,2-diyl, cyclohexane-1,3-diyl, cyclohexane-1,4-diyl, 3-(methane-1,1-diyl)-cyclohexane-1,3-diyl, cycloheptane-1,3-diyl or cyclooctane-1,4-diyl, each of the aforementioned radicals may be at least monosubstituted with $C_1$-$C_3$-alkyl.

It is preferred that the respective $C_5$-$C_{10}$-cycloalkylene radical is employed as a mixture of two or more individual cycloalkylene radicals having the same ring size. It is particularly preferred to employ a mixture of cyclohexane-1,3-diyl monosubstituted with methyl in position 2 or 4, respectively, of the cycle. The ratio of the two compounds is preferably in a range of 95:5 to 75:25, most preferably about 85:15 (4-methyl versus 2-methyl).

3-(methane-1,1-diyl)-cyclohexane-1,3-diyl is a preferred example for a $C_5$-$C_{10}$-cyclo-alkylene radical having a non-cyclic fragment in addition to its cyclic fragment. For this specific case, the non-cyclic fragment is a $C_1$-linker and the cyclic fragment is a $C_6$-cycle resulting in a $C_7$-cycloalkylene radical. 3-(methane-1,1-diyl)-cyclohexane-1,3-diyl may also be substituted with at least one $C_1$-$C_3$-alkyl, preferably with three methyl groups, in particular 3,5,5-trimethyl. The latter one is a fragment of isophorone diamine, which may be employed as backbone with general formula (I).

For the purposes of the present invention, the term "aralkyl", as defined below for, for example, the radical $R^2$ in formula (IIa), means that the substituent (radical) is an aromatic ("ar") combined with an alkyl substituent ("alkyl"). The aromatic "ar" part can be a monocyclic, bicyclic or optionally polycyclic aromatic. In the case of polycyclic aromatics, individual rings can optionally be fully or partially saturated. Preferred examples of aryl are phenyl, naphthyl or anthracyl, in particular phenyl.

Polyamines in the context of the present invention are (predominantly, and preferably only) linear compounds (in respect of its backbone without consideration of any alkoxylation), containing primary and/or secondary amino moieties but no tertiary amino moieties within its backbone.

Within the context of the present invention, the term "polyamine backbone" relates to those fragments of the inventive alkoxylated polyamines which are not alkoxylated. The polyamine backbone is employed within the present invention as an educt in step a) to be reacted first with at least one first alkylene oxide (AO1), followed by reaction (in step b)) with at least one lactone or hydroxy carbon acid, followed by ethoxylation within step c) and then alkoxylated again in step d) with at least one second alkylene oxide (AO2) in order to obtain the inventive alkoxylated polyamines ("alkoxylated compounds"). In step d) at least one second alkylene oxide (AO2) in this step must be different to ethylene oxide as employed in step c). Polyamines as such (backbones or not alkoxylated compounds) are known to a person skilled in the art.

Within the context of the present invention, the term "NH-functionality" is defined as follows: In case of (predominantly) linear amines, such as di- and oligo amines like N4 amine or hexamethylene diamine, the structure itself gives information about the content of primary, secondary and tertiary amines. A primary amino group (—$NH_2$) has two NH-functionalities, a secondary amino group only one NH functionality, and a tertiary amino group, by consequence, has no reactive NH functionality. The exact distribution of primary and secondary (and tertiary) amino groups can be determined as described in Lukovkin G. M., Pshezhetsky V. S., Murtazaeva G. A.: *Europ. Polymer Journal* 1973, 9, 559-565 and St. Pierre T., Geckle M.: *ACS Polym. Prep.* 1981, 22, 128-129.

The invention is specified in more detail as follows:

The invention relates to alkoxylated polyamine comprising up to 10, preferably up to 8, more preferably up to 6, most preferably up to 5 such as 4, 3 or 2 amine-groups obtainable by a process comprising the steps a) to c) and optional step d) as follows:

a) reaction of i) at least one polyamine comprising up to 10, preferably up to 8, more preferably up to 6, most preferably up to 5 amine-groups with ii) at least one first alkylene oxide (AO1), wherein 0.25 to 7.0 mol of alkylene oxide (AO1) is employed per mol of NH-functionality of polyamine, in order to obtain a first intermediate (I1), b) reaction of the first intermediate (I1) with at least one lactone and/or at least one hydroxy carbon acid, wherein 0.25 to 10 mol of lactone and/or of hydroxy carbon acid is employed per mol of NH-functionality of polyamine (as employed in step a)), in order to obtain a second intermediate (I2), c) reaction of the second intermediate (I2) with at least one second alkylene oxide (AO2), wherein at least 1 mol of alkylene oxide (AO2) is employed per mol of NH-functionality of polyamine (as employed in step a)), in order to obtain the alkoxylated polyamine or in case optional step d) is employed—a third intermediate (I3), d) optional reaction of the third intermediate (I3) with at least one second alkylene oxide (AO2), wherein at least 1 mol of alkylene oxide (AO2) is employed per mol of NH-functionality of polyamine (as employed in step a)), in order to obtain the alkoxylated polyamine, and wherein the second alkylene oxide (AO2) in this step is different to ethylene oxide in case only one second alkylene oxide (AO2) is employed in step d), wherein the alkylene oxide AO1 and/or AO2 is chosen such that at least 10, preferably at least 20, more preferably at least 30, more preferably at least 40, most preferably at least 50 weight percent of the total amount of moieties in the alkoxylated polyamine stemming from alkylene oxides (i.e. from AO1 and AO2) originates from C3 and/or C4-alkylene oxides, and wherein the total amount of alkylene oxide employed is from 0,5, preferably from 1, and up to 25, more preferably up to 20, even more preferably up to 17, and most preferably up to 15 mol per NH-functionality of polyamine (i.e. the polyamine as employed in step a).

The polyamine employed in step a) may be any of those compounds known to a person skilled in the art. It is preferred that the at least one polyamine as employed in step a) is defined according to general formula (I)

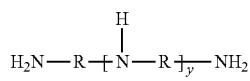

(I)

in which the variables are each defined as follows:
R represents identical or different,
  i) linear or branched $C_2$-$C_{12}$-alkylene radicals or
  ii) an etheralkyl unit of the following formula (III):

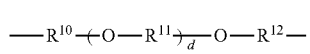

(III)

in which the variables are each defined as follows:
$R^{10}$, $R^{11}$, $R^{12}$ represent identical or different, linear or branched $C_2$-$C_6$-alkylene radicals and
d is an integer having a value in the range of 0 to 50 or
  iii) $C_5$-$C_{10}$ cycloalkylene radicals optionally substituted with at least one $C_1$-$C_3$ alkyl;
y is an integer having a value in the range of 0 to 8, preferably up to 6, more preferably up to 4, even more preferably up to 3, most preferably up to 2; preferably, R represents identical or different,
  ia) $C_2$-$C_6$-alkylene radicals being selected from ethylene, propylene and hexamethylene, or
  iib) $C_5$-$C_{10}$-cycloalkylene radicals optionally substituted with at least one $C_1$-$C_3$-alkyl, more preferably R is at least one $C_6$-$C_7$-cycloalkylene radical substituted with at least one methyl or ethyl,
more preferably R being selected only from group ia) before, and even more preferably R being selected from ethylene and/or propylene, and most preferably being ethylene.

In a preferred embodiment thereof, the alkoxylated polyamine comprises up to 5 amino-groups, such as 4, 3 or 2 amino-groups.

In a preferred embodiment of the present invention, the alkoxylated polyamine contains at least one residue according to general formula (IIa)

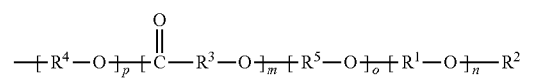

(IIa)

in which the variables are each defined as follows:
$R_1$ represents $C_2$-$C_{22}$-(1,2-alkylene) radicals;
$R^2$ represents hydrogen and/or $C_1$-$C_{22}$-alkyl and/or $C_7$-$C_{22}$-aralkyl;
$R^3$ represents linear or branched $C_1$-$C_{22}$-alkylene radicals;
$R^4$ represents $C_2$-$C_{22}$-(1,2-alkylene) radicals;
$R^5$ represents 1,2-ethylene;
m is an integer having a value of at least 1 and up to 10;
n is an integer having a value of at least 1 and up to 25, more preferably up to 20, even more preferably up to 15, such as 5-15;
o is an integer having a value of from 0 and up to 25, more preferably up to 20, even more preferably up to 15, most preferably 0;
p is an integer having a value of at least 1 and up to 5;
with the proviso that the sum of n+o+p is at most 25, preferably at most 20, even more preferably at most 17, and most preferably at most 15,
wherein at least 50 weight percent of the total amount of moieties the residues $R^1$, $R^4$ in the alkoxylated polyamine originates from $C^3$ and/or $C^4$-alkylene oxides,
and—when o is not zero—then $R^1$ and $R^5$ are selected such that the moieties containing $R^1$ and $R^5$ are of different chemical composition and/or different chemical structure (i.e. different arrangement of the alkylene oxides if more than one alkylene oxide is selected for $R^1$ and $R^5$ and the selected alkylene oxides are the same for both $R^1$ and $R^5$).

"Residue" in this invention means a substituent of a defined chemical nature as defined by the structures IIa, IIb and IIc, which reside on nitrogen-atoms of the polyamine, i.e. are chemically bonded via an addition reaction of the first unit, either the first alkylene oxide (as in structures IIa and IIc) or the first carbonyl-group (as in IIb) which stems from the lactone or hydroxy acid.

In addition to the presence of at least one residue according to general formula (IIa) as described above, it is preferred that the alkoxylated polyamine contains at least one residue according to general formula (IIb)

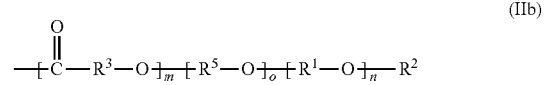

(IIb)

in which the variables are each defined as follows:
$R^1$ represents $C_2$-$C_{22}$-(1,2-alkylene) radicals;
$R^2$ represents hydrogen and/or $C_1$-$C_{22}$-alkyl and/or $C_7$-$C_{22}$-aralkyl;
$R^3$ represents linear or branched $C_1$-$C_{22}$-alkylene radicals;
$R^5$ represents 1,2-ethylene;
m is an integer having a value of at least 1, and up to 10;

n is an integer having a value of at least 1 and up to 25, preferably up to 20, more preferably up to 15, such as 5-15;

o is an integer having a value of from 0 and up to 25, preferably up to 20, more preferably up to 15, preferably 0;

wherein at least 50 weight percent of the total amount of moieties in residues $R_1$ and—if residues of the formula IIa are also present—also $R^4$, in the alkoxylated polyamine originates from $C_3$ and/or $C_4$-alkylene oxides, wherein $R^1$ and $R^5$ are selected such that the moieties containing $R^1$ and $R^5$ are of different chemical composition and/or different chemical structure (i.e. different arrangement of the alkylene oxides if more than one alkylene oxide is selected for $R^1$ and $R^5$ and the selected alkylene oxides are the same for both $R^1$ and $R^5$), with the proviso that the sum of n+o is at most 25, preferably at most 20, even more preferably at most 17, and most preferably at most 15.

In another embodiment of the present invention, it is preferred that the alkoxylated polyamine contains at least one residue according to general formula (IIc)

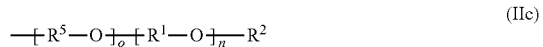

(IIc)

in which the variables are defined as follows:

$R^1$ represents $C_2$-$C_{22}$-(1,2-alkylene) radicals;

$R^2$ represents hydrogen and/or $C_1$-$C_{22}$-alkyl;

$R^5$ represents 1,2-ethylene;

n is an integer having a value of at least 5 and up to 100, preferably up to 25, more preferably up to 20, even more preferably up to 15, o is an integer having a value of at least 0 to 100, preferably up to 25, more preferably up to 20, even more preferably up to 15;

wherein at least 50 weight percent of the total amount of moieties in the alkoxylated polyamine stemming from alkylene oxides (i.e. the residues R1 and—if residues of the formula IIa are also present—also R4) originates from C3 and/or C4-alkylene oxides, with the proviso that the sum of n+o is at most 25, preferably at most 20, even more preferably at most 17, and most preferably at most 15.

In another embodiment of the present invention, it is preferred that i) step a) is carried out in the presence of water and/or in the presence of a base catalyst, and/or ii) the weight-average molecular weight (Mw) of the polyamine employed in step a) lies in the range of 50 to 2 000 g/mol, preferably in the range of up to 1000 g/mol, more preferably in the range of up to 500 g/mol, and/or iii) at least two different alkylene oxides are employed as second alkylene oxide (AO2) in step d) in consecutive order, preferably ethylene oxide followed by propylene oxide are employed as second alkylene oxide (AO2) in step d) in consecutive order; and/or iv) in step d) the second alkylene oxide (AO2) comprises >80% by weight, preferably >90% by weight, of propylene oxide and/or 1,2-butylene oxide; and/or v) residues according to general formula (IIc) do not account for >50% of all residues on the alkoxylated polyalkylene imine or alkoxylated polyamine.

Preferably at least one, more preferably at least two, more preferably at least three, even more preferably at least four and most preferably all of the five features before are present.

The person skilled in the art knows how to determine/measure the respective weight average molecular weight ($M_W$). This can be done, for example, by size exclusion chromatography (such as GPC). Preferably, $M_W$ values are determined by the method as follows: OECD TG 118 (1996), which means in detail OECD (1996), Test No. 118: *Determination of the Number-Average Molecular Weight and the Molecular Weight Distribution of Polymers using Gel Permeation Chromatography*, OECD Guidelines for the Testing of Chemicals, Section 1, OECD Publishing, Paris, also available on the internet, for example, under https://doi.org/10.1787/9789264069848-en.

Another embodiment of the present invention only relates to alkoxylated polyamines (as such) as described above, it is preferred that in the polyamine y is an integer having a value in the range of 0 to 3;

R represents identical or different, linear or branched $C_2$-$C_{12}$-alkylene radicals or an etheralkyl unit according to formula (III), wherein d is from 1 to 10, and $R^{10}$, $R^{11}$, $R^{12}$ are independently selected from linear or branched $C_3$ to $C_4$ alkylene radicals.

In another embodiment, the residue (IIa) accounts for at least 80, more preferably at least 90, even more preferably at least 95 weight percent of all residues (IIa), (IIb) and (IIc) attached to the amino-groups of the polyamine as employed in step a).

In another embodiment of the present invention, it is preferred that i) in step b) the lactone is caprolactone, and/or ii) in step b) the hydroxy carbon acid is lactic acid or glycolic acid, and/or iii) in step a) the first alkylene oxide (AO1) is at least one $C_2$-$C_{22}$-epoxide, preferably ethylene oxide and/or propylene oxide, and/or iv) in step c) the second alkylene oxide (AO2) is at least one $C_2$-$C_{22}$-epoxide, preferably propylene oxide or a mixture of ethylene oxide and propylene oxide.

In another embodiment of the present invention, it is preferred that i) in step a) 0.5 to 2 mol of alkylene oxide (AO1) is employed per mol of NH-functionality of polyamine, and/or ii) in step b) 0.5 to 3 mol of lactone and/or of hydroxy carbon acid is employed per mol of NH-functionality of polyamine (as employed in step a)), and/or iii) in step c) 5 to 14.5 mol of alkylene oxide (AO2) is employed per mol of NH-functionality of polyamine (as employed in step a)).

In one embodiment, the inventive alkoxylated polyamines are quaternized. A suitable degree of quaternization is up to 100%, in particular from 10 to 95%. The quaternization is effected preferably by introducing $C_1$-$C_{22}$-alkyl groups, $C_1$-$C_4$-alkyl groups and/or $C_7$-$C_{22}$aralkyl groups and may be undertaken in a customary manner by reaction with corresponding alkyl halides and dialkyl sulfates.

The quaternization may be advantageous in order to adjust the alkoxylated polyamines to the particular composition such as cosmetic compositions in which they are to be used, and to achieve better compatibility and/or phase stability of the formulation, as for example the hydrophilicity will be increased by cationic charges, and thus interaction with anionic surfaces increases.

The quaternization of alkoxylated polyamines is achieved preferably by introducing $C_1$-$C_{22}$ alkyl, $C_1$-$C_4$-alkyl groups and/or $C_7$-$C_{22}$ aralkyl, aryl or alkylaryl groups and may be undertaken in a customary manner by reaction with corresponding alkyl-, aralkyl-halides and dialkylsulfates, as described for example in WO 09/060059.

Quaternization can be accomplished, for example, by reacting an alkoxylated polyalkylene imine with an alkylation agent such as a $C_1$-$C_4$-alkyl halide, for example with methyl bromide, methyl chloride, ethyl chloride, methyl iodide, n-butyl bromide, isopropyl bromide, or with an aralkyl halide, for example with benzyl chloride, benzyl bromide or with a di-$C_1$-$C_{22}$-alkyl sulfate in the presence of a base, especially with dimethyl sulfate or with diethyl sulfate. Suitable bases are, for example, sodium hydroxide and potassium hydroxide.

The amount of alkylating agent determines the amount of quaternization of the amino groups in the polymer, i.e. the amount of quaternized moieties.

The amount of the quaternized moieties can be calculated from the difference of the amine number in the non-quaternized amine and the quaternized amine.

The amine number can be determined according to the method described in DIN 16945.

The quaternization can be carried out without any solvent. However, a solvent or diluent like water, acetonitrile, dimethylsulfoxide, N-methylpyrrolidone, etc. may be used. The reaction temperature is usually in the range from 10° C. to 150° C. and is preferably from 50° C. to 100° C.

The alkoxylated polyamines as described above may be—and preferably are—prepared by a process as described hereinafter. In the following the steps a) to d) (as described above for the alkoxylated polyamine) are described in more detail. The below information also applies to the above described polymer as such obtainable by the respective process. Within this process, a polyamine (as such) is according to step a) first reacted with a first alkylene oxide (AO1), followed in step b) by reaction of the respective intermediate (I1) with at least one lactone and/or at least one hydroxy carbon acid followed by ethoxylation in step c) and then (in step d)) followed by reaction with at least one second alkylene oxide (AO2), with at least one alkylene oxide different to ethylene oxide (of step c)), in order to obtain the respective alkoxylated compounds.

It has to be noted that the alkoxylation process as such, wherein polyamines are reacted with alkylene oxides according to step a), such as ethylene oxide or propylene oxide, is known to a person skilled in the art. The same methods can be applied for the present invention within step c), or within step d), respectively, wherein the respective intermediates (I2), which were obtained by reaction with a first alkylene oxide and afterwards with lactones or hydroxyl carbon acids, undergo first an ethoxylation process (in step c)), followed by the second alkoxylation process afterwards in step d).

The conversion rates of the respective steps can be determined according to methods known to the skilled person, such as NMR-spectroscopy. For example, both the first reaction step, the second reaction step and/or the third reaction step may be monitored by $^{13}$C-NMR-spectroscopy and/or $^1$H-NMR-spectroscopy.

In connection with the second step b) of the process for preparing an alkoxylated polyamine, the respective intermediate (I1) as obtained in step a) is reacted with at least one lactone and/or at least one hydroxycarbon acid. This second reaction step as such is known to a person skilled in the art.

However, it is preferred within this second reaction step b) that the reaction temperature is in a range between 50 to 200° C., more preferred between 70 to 180° C., most preferred in a range between 100 to 160° C.

This second reaction step b) may be carried out in the presence of at least one solvent and/or at least one catalyst. However, it is preferred within the second reaction step b) that the respective step is carried out without any solvent and/or without any catalyst. Suitable solvents are preferably selected from xylene, toluene, tetrahydrofuran (THF), methyl-tert. butyl ether or diethyl ether. Preferred catalysts are selected from alkali metal hydroxides or alkali metal alkoxides, such as KOMe or NaOMe.

As described above, the first, the third and/or the fourth reaction step (steps a), c) and d)) of the process as such (alkoxylation, in particular ethoxylation) is known to a person skilled in the art. The alkoxylation as such (first, third and fourth reaction step of the method) may independently from each other be carried out as a one-step reaction or the alkoxylation as such may be split into two or more individual steps.

It is preferred that the respective step (alkoxylation) is carried out as a single step reaction in connection with steps a), c) and/or d).

In a preferred embodiment, the alkoxylation step (a) is carried out as a single step reaction in the absence of any catalyst but in the presence of water.

In another embodiment, the alkoxylation step (a) is carried out at least in two steps, the first step being carried out in the absence of any catalyst but in the presence of water, the second (and optionally further steps) in the presence of a catalyst but in the absence of water.

Absence of water is defined according to this invention as residual water levels of <1 wt % water, preferably <0.5 wt % water and more preferably <0.25 wt % water.

Within this preferred embodiment, the alkoxylation steps (c) and (d) are carried out in the presence of at least one catalyst and/or in the absence of water.

Within this at least two-step reaction variant of the alkoxylation step (a) and these single step reactions of the alkoxylation steps ((c) and (d)), the catalyst is preferably a basic catalyst. Examples of suitable catalysts are alkali metal and alkaline earth metal hydroxides such as sodium hydroxide, potassium hydroxide and calcium hydroxide, alkali metal alkoxides, in particular sodium and potassium $C_1$-$C_4$-alkoxides, such as sodium methoxide, potassium methoxide, sodium ethoxide and potassium tert-butoxide, alkali metal and alkaline earth metal hydrides such as sodium hydride and calcium hydride, and alkali metal carbonates such as sodium carbonate and potassium carbonate. Preference is given to the alkali metal hydroxides and the alkali metal alkoxides, particular preference being given to potassium hydroxide, potassium methoxide and potassium tert-butoxide. Typical use amounts for the base are from 0.05 to 10% by weight, in particular from 0.5 to 2% by weight, based on the total amount of polyalkylene imine or polyamine, hydroxy carbon acid and alkylene oxide.

In case that the alkoxylation step (a) is carried out at least in two steps, the first step is being carried out in the absence of any catalyst but in the presence of water. In this procedure, an initial incipient alkoxylation of polyamine is carried out. In this first part of the step a), the polyamine is reacted only with a portion of the total amount of alkylene oxide used, which corresponds to about 1 mole of alkylene oxide per mole of NH moiety or NH functionality, respectively. This reaction (of the first part of the step a)) is undertaken generally in the absence of a catalyst in aqueous solution at from 70 to 200° C., preferably from 80 to 160° C., under a pressure of up to 10 bar, in particular up to 8 bar. The water content in this first part of step a) is >1 wt %, preferably >5 wt % and more preferably >10 wt %.

Said second part of the alkoxylation reaction (step a) of the alternative method) is undertaken typically in the presence of the same type of catalyst as described above for the single step alkoxylation reactions (step (c) and (d)).

All catalyzed steps of alkoxylation in the absence of water may be undertaken in substance (variant a)) or in an organic solvent (variant b)). The process conditions specified below may be used for both steps of the alkoxylation reaction.

In variant a), the aqueous solution of the incipiently alkoxylated polyamine obtained in the first step, after addition of the catalyst, is initially dewatered. This can be done in a simple manner by heating to from 80 to 150° C. and distilling off the water under a reduced pressure of from less than 30 mbar. The subsequent reactions with the alkylene oxides are effected typically at from 70 to 200° C., preferably from 100 to 180° C., and at a pressure of up to 10 bar, in particular up to 8 bar, and a continued stirring time of from about 0.5 to 4 h at from about 100 to 160° C. and constant pressure follows in each case.

Suitable reaction media for variant b) are in particular nonpolar and polar aprotic organic solvents. Examples of particularly suitable nonpolar aprotic solvents include aliphatic and aromatic hydrocarbons such as hexane, cyclohexane, toluene and xylene. Examples of particularly suitable polar aprotic solvents are ethers, in particular cyclic ethers such as tetrahydrofuran and dioxane, N,N-dialkylamides such as dimethylformamide and dimethylacetamide, and N-alkyllactams such as N-methylpyrrolidone. It is of course also possible to use mixtures of these aprotic solvents. Preferred solvents are xylene and toluene.

In variant b) too, the solution obtained in the first step, after addition of catalyst and solvent, is initially dewatered, which is advantageously done by separating out the water at a temperature of from 120 to 180° C., preferably supported by a gentle nitrogen stream. The subsequent reaction with the alkylene oxide may be effected as in variant a).

In variant a), the alkoxylated polyamine is obtained directly in substance and may be converted if desired to an aqueous solution. In variant b), the organic solvent is typically removed and replaced by water. The products may of course also be isolated in substance.

The amount of residues according to, for example, formula (IIa), formula (IIb) and/or formula (IIc) can be controlled by several factors, such as the stoichiometry of the educts employed, the reaction temperature within the individual steps, the amount and/or type of the catalysts employed and/or the selected solvent. In a preferred embodiment of the present invention, residues according to general formula (IIc) do not account for >50% of all residues on the alkoxylated polyamine.

Another subject matter and thus embodiment of the present invention is the use of the above-mentioned alkoxylated polyamines in fabric and home care products, in particular cleaning compositions for improved oily and fatty stain removal, wherein the cleaning composition is preferably a laundry detergent formulation and/or a manual dish wash detergent formulation, more preferably a liquid laundry detergent formulation and/or a liquid manual dish wash detergent formulation.

Another subject-matter and thus embodiment of the present invention is, therefore, a cleaning composition, fabric and home care product, comprising at least one alkoxylated polyamine, as defined above, preferably cleaning composition and/or fabric and home care product, more preferably a laundry formulation.

In particular, it is a cleaning composition for improved oily and fatty stain removal, preferably a laundry detergent formulation and/or a manual dish wash detergent formulation, more preferably a liquid laundry detergent formulation and/or a liquid manual dish wash detergent formulation.

Hence, in one embodiment, the alkoxylated polyamine is used in cleaning compositions and/or in fabric and home care products, preferably in cleaning compositions for
  i) clay removal, and/or
  ii) soil removal of particulate stains, and/or
  iii) dispersion and/or emulsification of soils, and/or
  iv) modification of treated surface to improve removal upon later re-soiling, and/or
  v) whiteness improvement,
  each of the before mentioned options i) to v) preferably for use in laundry care compositions and more preferably in a laundry detergent composition.

Further encompassed by this invention is the use of cleaning composition, as defined herein before, for
  i) clay removal, and/or
  ii) soil removal of particulate stains, and/or
  iii) dispersion and/or emulsification of soils, and/or
  iv) modification of treated surface to improve removal upon later re-soiling, and/or
  v) whiteness improvement.

At least one alkoxylated polyamine (hereinafter also named "inventive polymer" or "polymer of the invention") as described herein is present in said inventive cleaning compositions and is used at a concentration of 0.1 to 10, preferably from about 0.25% to 5%, more preferably from about 0.5% to about 3%, and most preferably from about 1% to about 3%, in relation to the total weight of such composition; such cleaning composition may—and preferably does—further comprise a from about 1% to about 70% by weight of a surfactant system.

Similarly, the cleaning compositions and/or fabric and home care products as detailed in the embodiments before comprise at least one inventive polymer at a concentration of 0.1 to 10, preferably from about 0.25% to 5%, more preferably from about 0.5% to about 3%, and most preferably from about 1% to about 3%, in relation to the total weight of such composition.

Preferably, the inventive cleaning composition is a fabric and home care product, preferably a fabric and home care product, more preferably a laundry detergent or manual dish washing detergent, comprising at least one inventive polymer, and optionally further comprising at least one surfactant or a surfactant system, providing improved removal, dispersion and/or emulsification of soils and/or modification of treated surfaces and/or whiteness maintenance of treated surfaces.

A further subject-matter of the present invention is a fabric and home care product comprising a polymer of this invention described above. The product can be a laundry detergent, a dish-washing detergent, a cleaning composition and/or a fabric and home care product containing at least one polymer of this invention as described above.

Laundry detergents, cleaning compositions and/or fabric and home care products as such are known to a person skilled in the art. Any composition etc. known to a person skilled in the art, in connection with the respective use, can be employed within the context of the present invention.

The laundry detergent, the cleaning composition and/or the fabric and home care product are preferred, wherein the at least one polymer is present in an amount ranging from about 0.01% to about 20%, preferably from about 0.05% to 15%, more preferably from about 0.1% to about 10%, and most preferably from about 0.5% to about 5%, in relation to the total weight of such composition or product.

Laundry detergent composition: Suitable laundry detergent compositions include laundry detergent powder compositions, laundry detergent liquid compositions, laundry detergent gel compositions, and water-soluble laundry detergent compositions.

Dish-washing detergent composition: Suitable dish-washing detergent compositions include hand dish-washing detergent compositions and automatic dish-washing detergent compositions.

Surfactant System: The compositions comprise a surfactant system in an amount sufficient to provide desired cleaning properties. In some embodiments, the composition comprises, by weight of the composition, from about 1% to about 70% of a surfactant system. In other embodiments, the liquid composition comprises, by weight of the composition, from about 2% to about 60% of the surfactant system. In further embodiments, the composition comprises, by weight of the composition, from about 5% to about 30% of the surfactant system. The surfactant system may comprise a detersive surfactant selected from anionic surfactants, nonionic surfactants, cationic surfactants, zwitterionic surfactants, amphoteric surfactants, ampholytic surfactants, and mixtures thereof. Those of ordinary skill in the art will understand that a detersive surfactant encompasses any surfactant or mixture of surfactants that provide cleaning, stain removing, or laundering benefit to soiled material.

Anionic Surfactants: In some examples, the surfactant system of the composition may comprise from about 1% to about 70%, by weight of the surfactant system, of one or more anionic surfactants. In other examples, the surfactant system of the composition may comprise from about 2% to about 60%, by weight of the surfactant system, of one or more anionic surfactants. In further examples, the surfactant system of the composition may comprise from about 5% to about 30%, by weight of the surfactant system, of one or more anionic surfactants. In further examples, the surfactant system may consist essentially of, or even consist of one or more anionic surfactants.

Specific, non-limiting examples of suitable anionic surfactants include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates.

Other useful anionic surfactants can include the alkali metal salts of alkyl benzene sulfonates, in which the alkyl group contains from about 9 to about 15 carbon atoms, in straight chain (linear) or branched chain configuration.

Suitable alkyl benzene sulphonate (LAS) may be obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable. In one aspect a magnesium salt of LAS is used.

The detersive surfactant may be a mid-chain branched detersive surfactant, in one aspect, a mid-chain branched anionic detersive surfactant, in one aspect, a mid-chain branched alkyl sulphate and/or a mid-chain branched alkyl benzene sulphonate, for example, a mid-chain branched alkyl sulphate. In one aspect, the mid-chain branches are $C_{1-4}$ alkyl groups, typically methyl and/or ethyl groups.

Other anionic surfactants useful herein are the water-soluble salts of: paraffin sulfonates and secondary alkane sulfonates containing from about 8 to about 24 (and in some examples about 12 to 18) carbon atoms; alkyl glyceryl ether sulfonates, especially those ethers of $C_{8-18}$ alcohols (e.g., those derived from tallow and coconut oil). Mixtures of the alkylbenzene sulfonates with the above-described paraffin sulfonates, secondary alkane sulfonates and alkyl glyceryl ether sulfonates are also useful. Further suitable anionic surfactants include methyl ester sulfonates and alkyl ether carboxylates.

The anionic surfactants may exist in an acid form, and the acid form may be neutralized to form a surfactant salt. Typical agents for neutralization include metal counterion bases, such as hydroxides, e.g., NaOH or KOH. Further suitable agents for neutralizing anionic surfactants in their acid forms include ammonia, amines, or alkanolamines. Non-limiting examples of alkanolamines include monoethanolamine, diethanolamine, triethanolamine, and other linear or branched alkanolamines known in the art; suitable alkanolamines include 2-amino-1-propanol, 1-aminopropanol, monoisopropanolamine, or 1-amino-3-propanol. Amine neutralization may be done to a full or partial extent, e.g., part of the anionic surfactant mix may be neutralized with sodium or potassium and part of the anionic surfactant mix may be neutralized with amines or alkanolamines.

Nonionic surfactants: The surfactant system of the composition may comprise a nonionic surfactant. In some examples, the surfactant system comprises up to about 25%, by weight of the surfactant system, of one or more nonionic surfactants, e.g., as a co-surfactant. In some examples, the compositions comprises from about 0.1% to about 15%, by weight of the surfactant system, of one or more nonionic surfactants. In further examples, the compositions comprises from about 0.3% to about 10%, by weight of the surfactant system, of one or more nonionic surfactants.

Suitable nonionic surfactants useful herein can comprise any conventional nonionic surfactant. These can include, for e.g., alkoxylated fatty alcohols and amine oxide surfactants.

Other non-limiting examples of nonionic surfactants useful herein include: $C_8$-$C_{18}$ alkyl ethoxylates, such as, NEODOL® nonionic surfactants from Shell; $C_6$-$C_{12}$ alkyl phenol alkoxylates wherein the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols (BA); $C_{14}$-$C_{22}$ mid-chain branched alkyl alkoxylates ($BAE_x$), wherein x is from 1 to 30; alkylpolysaccharides; specifically alkylpolyglycosides; Polyhydroxy fatty acid amides; and ether capped poly(oxyalkylated) alcohol surfactants.

Suitable nonionic detersive surfactants also include alkyl polyglucoside and alkyl alkoxylated alcohol. Suitable nonionic surfactants also include those sold under the tradename Lutensol® from BASF.

Anionic/Nonionic Combinations: The surfactant system may comprise combinations of anionic and nonionic surfactant materials. In some examples, the weight ratio of anionic surfactant to nonionic surfactant is at least about 2:1. In other examples, the weight ratio of anionic surfactant to nonionic surfactant is at least about 5:1. In further examples, the weight ratio of anionic surfactant to nonionic surfactant is at least about 10:1.

Cationic Surfactants: The surfactant system may comprise a cationic surfactant. In some aspects, the surfactant system comprises from about 0% to about 7%, or from about 0.1% to about 5%, or from about 1% to about 4%, by weight of the surfactant system, of a cationic surfactant, e.g., as a co-surfactant. In some aspects, the compositions of the invention are substantially free of cationic surfactants and surfactants that become cationic below a pH of 7 or below a pH of 6. Non-limiting examples of cationic surfactants include: the quaternary ammonium surfactants, which can have up to 26 carbon atoms include: alkoxylate quaternary ammonium (AQA) surfactants; dimethyl hydroxyethyl quaternary ammonium; dimethyl hydroxyethyl lauryl ammonium chloride; polyamine cationic surfactants; cationic ester surfactants; and amino surfactants, specifically amido propyldimethyl amine (APA).

Suitable cationic detersive surfactants also include alkyl pyridinium compounds, alkyl quaternary ammonium compounds, alkyl quaternary phosphonium compounds, alkyl ternary sulphonium compounds, and mixtures thereof.

Zwitterionic Surfactants: Examples of zwitterionic surfactants include: derivatives of secondary and tertiary amines, derivatives of heterocyclic secondary and tertiary amines, or derivatives of quaternary ammonium, quaternary phosphonium or tertiary sulfonium compounds. Betaines, including alkyl dimethyl betaine and cocodimethyl amidopropyl betaine, $C_8$ to $C_{18}$ (for example from $C_{12}$ to $C_{18}$) amine oxides and sulfo and hydroxy betaines, such as N-alkyl-N,N-dimethylammino-1-propane sulfonate where the alkyl group can be $C_8$ to $C_{18}$ and in certain embodiments from $C_{10}$ to $C_{14}$.

Amphoteric Surfactants: Examples of amphoteric surfactants include aliphatic derivatives of secondary or tertiary amines, or aliphatic derivatives of heterocyclic secondary and tertiary amines in which the aliphatic radical may be straight- or branched-chain and where one of the aliphatic substituents contains at least about 8 carbon atoms, typically from about 8 to about 18 carbon atoms, and at least one of the aliphatic substituents contains an anionic water-solubilizing group, e.g. carboxy, sulfonate, sulfate. Examples of compounds falling within this definition are sodium 3-(dodecylamino)propionate, sodium 3-(dodecylamino) propane-1-sulfonate, sodium 2-(dodecylamino)ethyl sulfate, sodium 2-(dimethylamino) octadecanoate, disodium 3-(N-carboxymethyldodecylamino)propane 1-sulfonate, disodium octadecyl-imminodiacetate, sodium 1-carboxymethyl-2-undecylimidazole, and sodium N,N-bis (2-hydroxyethyl)-2-sulfato-3-dodecoxypropylamine. Suitable amphoteric surfactants also include sarcosinates, glycinates, taurinates, and mixtures thereof.

Branched Surfactants: Suitable branched detersive surfactants include anionic branched surfactants selected from branched sulphate or branched sulphonate surfactants, e.g., branched alkyl sulphate, branched alkyl alkoxylated sulphate, and branched alkyl benzene sulphonates, comprising one or more random alkyl branches, e.g., $C_{1-4}$ alkyl groups, typically methyl and/or ethyl groups.

The branched detersive surfactant may be a mid-chain branched detersive surfactant, typically, a mid-chain branched anionic detersive surfactant, for example, a mid-chain branched alkyl sulphate and/or a mid-chain branched alkyl benzene sulphonate. In some aspects, the detersive surfactant is a mid-chain branched alkyl sulphate. In some aspects, the mid-chain branches are $C_{1-4}$ alkyl groups, typically methyl and/or ethyl groups.

Further suitable branched anionic detersive surfactants include surfactants derived from alcohols branched in the 2-alkyl position, such as those sold under the trade names Isalchem®123, Isalchem®125, Isalchem®145, Isalchem®167, which are derived from the oxo process. Due to the oxo process, the branching is situated in the 2-alkyl position. These 2-alkyl branched alcohols are typically in the range of $C_{11}$ to $C_{14}/C_{15}$ in length and comprise structural isomers that are all branched in the 2-alkyl position.

Adjunct Cleaning Additives: The compositions of the invention may also contain adjunct cleaning additives. Suitable adjunct cleaning additives include builders, structurants or thickeners, clay soil removal/anti-redeposition agents, polymeric soil release agents, polymeric dispersing agents, polymeric grease cleaning agents, enzymes, enzyme stabilizing systems, bleaching compounds, bleaching agents, bleach activators, bleach catalysts, brighteners, dyes, hueing agents, dye transfer inhibiting agents, chelating agents, suds supressors, softeners, and perfumes.

Enzymes

Proteases: The composition of the invention can comprise a protease in addition to the protease of the invention. A mixture of two or more proteases can contribute to an enhanced cleaning across a broader temperature, cycle duration, and/or substrate range, and provide superior shine benefits, especially when used in conjunction with an anti-redeposition agent and/or a sulfonated polymer.

Suitable proteases for use in combination with the variant proteases of the invention include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), especially those derived from Bacillus, such as *Bacillus* sp., *B. lentus*, *B. alkalophilus*, *B. subtilis*, *B. amyloliquefaciens*, *B. pumilus*, *B. gibsonii*, and *B. akibaii* described in WO2004067737, WO2007131656, WO2015091990, WO2015024739, WO2015143360, U.S. Pat. Nos. 6,312,936 B1, 5,679,630, 4,760,025, DE102006022216A1, DE102006022224A1, WO2015089447, WO2015089441, WO2016066756, WO2016066757, WO2016069557, WO2016069563, WO2016069569, WO2016174234, WO2017/215925, WO2020207944 and WO2020114968. Specifically, mutations S9R, A15T, V66A, A188P, V199I, Q239R, N255D (savinase numbering system).

(b) trypsin-type or chymotrypsin-type proteases, such as trypsin (e.g., of porcine or bovine origin), including the *Fusarium* protease described in WO 89/06270 and the chymotrypsin proteases derived from *Cellumonas* described in WO 05/052161 and WO 05/052146.

(c) metalloproteases, especially those derived from *Bacillus amyloliquefaciens* described in WO07/044993A2; from *Bacillus, Brevibacillus, Thermoactinomyces,*

*Geobacillus, Paenibacillus, Lysinibacillus* or *Streptomyces* spp. Described in WO2014194032, WO2014194054 and WO2014194117; from *Kribella alluminosa* described in WO2015193488; and from *Streptomyces* and *Lysobacter* described in WO2016075078.

(d) protease having at least 90% identity to the subtilase from *Bacillus* sp. TY145, NCIMB 40339, described in WO92/17577 (Novozymes A/S), including the variants of this *Bacillus* sp TY145 subtilase described in WO2015024739, and WO2016066757.

Especially preferred additional proteases for the detergent of the invention are polypeptides demonstrating at least 90%, preferably at least 95%, more preferably at least 98%, even more preferably at least 99% and especially 100% identity with the wild-type enzyme from *Bacillus lentus*, comprising mutations in one or more, preferably two or more and more preferably three or more of the following positions, using the BPN' numbering system and amino acid abbreviations as illustrated in WO00/37627, which is incorporated herein by reference: S9R, A15T, V68A, N76D, N87S, S99D, S99SD, S99A, S101G, S101M, S103A, V104N/I, G118V, G118R, S128L, P129Q, S130A, Y167A, R170S, A194P, V205I, Q206L/D/E, Y209W, M222S, Q245R and/or M222S.

Most preferably the additional protease is selected from the group of proteases comprising the below mutations (BPN' numbering system) versus either the PB92 wild-type (in WO 08/010925) or the subtilisin 309 wild-type (sequence as per PB92 backbone, except comprising a natural variation of N87S).

(i) G118V+S128L+P129Q+S130A
(ii) S101M+G118V+S128L+P129Q+S130A
(iii) N76D+N87R+G118R+S128L+P129Q+S130A+S188D+N248R
(iv) N76D+N87R+G118R+S128L+P129Q+S130A+S188D+V244R
(v) N76D+N87R+G118R+S128L+P129Q+S130A
(vi) V68A+N87S+S101G+V104N
(vii) S99AD
(viii) S9R+A15T+V68A+N218D+Q245R Suitable commercially available additional protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase®, Coronase®, Blaze®, Blaze Ultra® and Esperase® by Novozymes A/S (Denmark); those sold under the tradename Maxatase®, Maxacal®, Maxapem®, Properase®, Purafect®, Purafect Prime®, Purafect Ox®, FN3®, FN4®, Excellase®, Ultimase® and Purafect OXP® by Dupont; those sold under the tradename Opticlean® and Optimase® by Solvay Enzymes; and those available from Henkel/Kemira, namely BLAP (sequence shown in FIG. 29 of U.S. Pat. No. 5,352,604 with the following mutations S99D+S101 R+S103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D); and KAP (*Bacillus alkalophilus* subtilisin with mutations A230V+S256G+S259N) from Kao.

Especially preferred for use herein in combination with the variant protease of the invention are commercial proteases selected from the group consisting of Properase®, Blaze®, Ultimase®, Everlase®, Savinase®, Excellase®, Blaze Ultra®, BLAP and BLAP variants.

Preferred levels of protease in the product of the invention include from about 0.05 to about 10, more preferably from about 0.5 to about 7 and especially from about 1 to about 6 mg of active protease/g of composition.

Lipases: The enzyme system preferably further comprises a lipase. The presence of oils and/or grease can further increase the resiliency of stains comprising mannans and other polysaccharides. As such, the presence of lipase in the enzyme package can further improve the removal of such stains. Suitable lipases include those of bacterial, fungal or synthetic origin, and variants thereof. Chemically modified or protein engineered mutants are also suitable. Examples of suitable lipases include lipases from *Humicola* (synonym *Thermomyces*), e.g., from *H. lanuginosa* (T. lanuginosus).

The lipase may be a "first cycle lipase", e.g. such as those described in WO06/090335 and WO 13/116261. In one aspect, the lipase is a first-wash lipase, preferably a variant of the wild-type lipase from *Thermomyces lanuginosus* comprising T231R and/or N233R mutations.

Preferred lipases include those sold under the tradenames Lipex®, Lipolex® and Lipoclean® by Novozymes, Bagsvaerd, Denmark.

Other suitable lipases include: Liprl 139, e.g. as described in WO2013/171241; TfuLip2, e.g. as described in WO2011/084412 and WO2013/033318; Pseudomonas stutzeri lipase, e.g. as described in WO2018228880; *Microbulbifer thermotolerans* lipase, e.g. as described in WO2018228881; *Sulfobacillus acidocaldarius* lipase, e.g. as described in EP3299457; LIP062 lipase e.g. as described in WO2018209026; PinLip lipase e.g. as described in WO2017036901 and *Absidia* sp. lipase e.g. as described in WO2017005798.

Suitable lipases are commercially available from Novozymes, for example as Lipex Evity 100L, Lipex Evity 200L (both liquid raw materials) and Lipex Evity 105T (a granulate). These lipases have different structures to the products Lipex 100L, Lipex 100T and Lipex Evity 100T which are outside the scope of the invention.

Cellulases: Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum*. disclosed in U.S. Pat. Nos. 4,435,307, 5,648,263, 5,691,178, 5,776,757 and 5,691,178.

Suitable endoglucanases are sold under the tradenames Celluclean® and Whitezyme® (Novozymes A/S, Bagsvaerd, Denmark). Examples include Celluclean® 5000L, Celluclean® Classic 400L, Celluclean® Classic 700T, Celluclean® 4500T, Whitezyme® 1.5T, Whitezyme® 2.0L.

Other commercially available cellulases include Celluzyme®, Carezyme®, Carezyme® Premium (Novozymes A/S), Clazinase®, Puradax HA®, Revitalenz® 1000, Revitalenz® 2000 (Genencor International Inc.), KAC-500(B)® (Kao Corporation), Biotouch® FCL, Biotouch® DCL, Biotouch® DCC, Biotouch® NCD, Biotouch® FCC, Biotouch® FLX1 (AB Enzymes)

Suitable glucanases include endo-β-1,3-glucanases, preferably from E. C. class 3.2.1.39, preferably obtained from *Paenibacillus* sp, *Zobellia galactanivorans, Thermotoga petrophila* or *Trichoderma* sp micro-organism, preferably *Paenibacillus* sp or *Zobellia galactanivorans*, most preferably *Paenibacillus* sp.

Amylases: Preferably the composition of the invention comprises an amylase. Suitable alpha-amylases include those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCBI 12289, NCBI 12512, NCBI 12513, DSM 9375 (U.S. Pat. No. 7,153,818) DSM 12368, DSMZ no. 12649, KSM AP1378 (WO 97/00324), KSM K36 or KSM K38 (EP 1,022,334). Preferred amylases include:

(a) variants described in U.S. Pat. No. 5,856,164 and WO99/23211, WO 96/23873, WO00/60060, WO06/002643 and WO2017/192657,
(b) variants described in WO2011/100410 and WO2013/003659.
(c) variants in U.S. Pat. No. 6,093,562.
(d) variants described in WO 09/149130.
(e) variants described in WO10/115021.
(f) variants in WO2016091688.
(g) variants described in WO2014099523.
(h) variants described in WO2014099523.
(i) variants in WO2009149271).
(j) variants described in WO2016180748.
(k) variants described in WO2018060216.

Preferred amylases are engineered enzymes, wherein one or more of the amino acids prone to bleach oxidation have been substituted by an amino acid less prone to oxidation. In particular it is preferred that methionine residues are substituted with any other amino acid. In particular it is preferred that the methionine most prone to oxidation is substituted.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL®, ATLANTIC®, ACHIEVE ALPHA®, AMPLIFY® PRIME, INTENSA® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE®, PREFERENZ S® series (including PREFERENZ S1000® and PREFERENZ S2000® and PURASTAR OXAM® (DuPont., Palo Alto, California) and KAM® (Kao, 14-10 Nihonbashi Kayabacho, 1-chome, Chuo-ku Tokyo 103-8210, Japan).

Preferably, the composition comprises at least 0.01 mg, preferably from about 0.05 to about 10, more preferably from about 0.1 to about 6, especially from about 0.2 to about 5 mg of active amylase/g of composition.

Peroxidases/Oxidases: Suitable peroxidases/oxidases include those of plant, bacterial or fungal origin. Chemically modified or protein engineered mutants are included. Examples of useful peroxidases include peroxidases from *Coprinus*, e.g., from *C. cinereus*, and variants thereof as those described in WO 93/24618, WO 95/10602, and WO 98/15257.

Commercially available peroxidases include GUARDZYME® (Novozymes A/S).

Pectate lyases: Suitable pectate lyases include those sold under the tradenames Pectawash®, Pectaway®, X-Pect®, (all Novozymes A/S, Bagsvaerd, Denmark) Preferenz® F1000 (DuPont Industrial Biosciences).

Mannanases: The composition preferably comprises one of more mannanase enzymes. As used herein, the term "mannanase" or "galactomannanase" denotes a mannanase enzyme defined according to that known in the art as mannan endo-1,4-beta-mannosidase and having the alternative names beta-mannanase and endo-1,4-mannanase and catalysing hydrolysis of 1,4-beta-D-mannosidic linkages in mannans, galactomannans, glucomannans, and galactoglucomannans. Mannanases are classified according to the Enzyme Nomenclature as EC 3.2.1.78 and belong in Glycosyl Hydrolase families 5, 26 and 113. Many suitable mannanases belong to Glycosyl Hydrolase family 5. Commercially available mannanases include all those sold under the tradenames Mannaway® (Novozymes A/S) such as Mannaway® 200L and Mannaway Evity 4.0T Other commercially available mannanases include Effectenz® M1000, Mannastar® 375, Preferenz M100 and Purabrite® (all DuPont Industrial Biosciences) and Biotouch M7 (AB Enzymes). Other suitable mannanases belong to Glycosyl Hydrolase family 26 including those described in WO2018191135, WO2015040159, WO2017021515, WO2017021516, WO2017021517 and WO2019081515. Suitable mixtures of mannanases include the combinations of Glycosyl Hydrolase family 5 and Glycosyl Hydrolase family 26 mannanases described in WO2019081515.

Xanthan gum-degrading enzymes: The composition may comprise one of more xanthan gum-degrading enzymes. Suitable enzymes for degradation of xanthan gum-based soils include xanthan endoglucanase, optionally in conjunction with a xanthan lyase. As used herein, the term "xanthan endoglucanase" denotes an enzyme exhibiting endo-β-1,4-glucanase activity that is capable of catalysing hydrolysis of the 1,4-linked β-D-glucose polymeric backbone of xanthan gum, optionally in conjunction with a suitable xanthan lyase enzyme. Suitable xanthan endoglucanases are described in WO2013167581, WO2015181299, WO2015181292, WO2017046232, WO2017046260, WO201837062, WO201837065, WO2019038059 and WO2019162000. As used herein, the term "xanthan lyase" denotes an enzyme that cleaves the β-D-mannosyl-β-D-1,4-glucuronosyl bond of xanthan gum. Such enzymes belong to E. C. 4.2.2.12. Suitable xanthan lyases are described in WO2015001017, WO2018037061, WO201837064, WO2019038060, WO2019162000 and WO2019038057.

Nucleases: Preferably the composition comprises a nuclease such as a RNase or DNase or mixtures thereof. The nuclease enzyme is an enzyme capable of cleaving the phosphodiester bonds between the nucleotide sub-units of nucleic acids. The nuclease enzyme herein is preferably a deoxyribonuclease or ribonuclease enzyme or a functional fragment thereof. By functional fragment or part is meant the portion of the nuclease enzyme that catalyzes the cleavage of phosphodiester linkages in the DNA backbone and so is a region of said nuclease protein that retains catalytic activity. Thus it includes truncated, but functional versions, of the enzyme and/or variants and/or derivatives and/or homologues whose functionality is maintained.

Preferably the nuclease enzyme is a deoxyribonuclease, preferably selected from any of the classes E. C. 3.1.21.x, where x=1, 2, 3, 4, 5, 6, 7, 8 or 9, E. C. 3.1.22.y where y=1, 2, 4 or 5, E. C. 3.1.30.z where z=1 or 2, E. C. 3.1.31.1 and mixtures thereof.

DNase: Suitable DNases include wild-types and variants of DNases defined in WO2017162836 (Novozymes), and variants of the Bacillus cibi DNase including those described in WO2018011277 (Novozymes), incorporated herein by reference. Preferred DNases are as claimed in co-pending European Patent Application No. EP18202967.

RNase: suitable RNases include wild-types and variants of DNases defined in WO2018178061 (Novozymes), incorporated herein by reference. Hexosaminidases: The composition may comprise one or more hexosaminidases. The term hexosaminidase includes "dispersin" and the abbreviation "Dsp", which means a polypeptide having hexosaminidase activity, EC 3.2.1.—that catalyzes the hydrolysis of β-1,6-glycosidic linkages of N-acetyl-glucosamine polymers found in soils of microbial origin. The term hexosaminidase includes polypeptides having N-acetylglucosaminidase activity and β-N-acetylglucosaminidase activity.

Hexosaminidase activity may be determined according to Assay II described in WO2018184873. Suitable hexosaminidases include those disclosed in WO2017186936, WO2017186937, WO2017186943, WO2017207770, WO2018184873, WO2019086520, WO2019086528, WO2019086530, WO2019086532, WO2019086521, WO2019086526, WO2020002604, WO2020002608, WO2020007863, WO2020007875, WO2020008024, WO2020070063, WO2020070249, WO2020088957, WO2020088958 and WO2020207944. Variants of the Terribacillus saccharophilus hexosaminidase of WO2020207944 may be preferred, especially the variants with improved thermostability disclosed in that publication.

Galactanases: Preferably the composition comprises a galactanase, ie. an extracellular polymer-degrading enzyme that includes an endo-beta-1,6-galactanase enzyme. The term "endo-beta-1,6-galactanase" or "a polypeptide having endo-beta-1,6-galactanase activity" means a endo-beta-1,6-galactanase activity (EC 3.2.1.164) from the glycoside hydrolase family 30 that catalyzes the hydrolytic cleavage of 1,6-3-D-galactooligosaccharides with a degree of polymerization (DP) higher than 3, and their acidic derivatives with 4-O-methylglucosyluronate or glucosyluronate groups at the non-reducing terminals. For purposes of the present disclosure, endo-beta-1,6-galactanase activity is determined according to the procedure described in WO 2015185689 in Assay I. Suitable examples from class EC 3.2.1.164 are described in WO 2015185689.

The additional enzyme(s) may be included in the detergent composition by adding separate enzyme additives containing an additional enzyme, or a combined enzyme additive comprising two or several or all of the additional enzymes. Such an enzyme additive can be in the form of a granulate, a liquid or slurry, preferably additionally comprising an enzyme stabiliser.

Preferably each additional enzyme will be present in the composition in an amount of at least 0.0001 to about 0.1% weight percent of pure active enzyme protein, such as from about 0.0001% to about 0.01%, from about 0.001% to about 0.01% or from about 0.001% to about 0.01% based on the weight of the composition.

Other Enzymes

The enzyme system can comprise other enzymes. Suitable enzymes provide cleaning performance and/or fabric care benefits. Examples of other suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lichenirase, lipoxygenases, ligninases, pullulanases, tannases, pentosanases, malanases, ß-glucanases, arabinosidases, hyaluronidase, chondroitinase, laccase, and known amylases, or combinations thereof. A preferred enzyme system further comprises a cocktail of conventional detersive enzymes such as protease, lipase, cutinase and/or cellulase in conjunction with amylase. Detersive enzymes are described in greater detail in U.S. Pat. No. 6,579,839.

Enzyme Stabilizing System: The enzyme-containing compositions described herein may optionally comprise from about 0.001% to about 10%, in some examples from about 0.005% to about 8%, and in other examples, from about 0.01% to about 6%, by weight of the composition, of an enzyme stabilizing system. The enzyme stabilizing system can be any stabilizing system which is compatible with the detersive enzyme. In the case of aqueous detergent compositions comprising protease, a reversible protease inhibitor, such as a boron compound, including borate, 4-formyl phenylboronic acid, phenylboronic acid and derivatives thereof, or compounds such as calcium formate, sodium formate and 1,2-propane diol may be added to further improve stability.

Builders: The compositions of the present invention may optionally comprise a builder. Built compositions typically comprise at least about 1% builder, based on the total weight of the composition. Liquid compositions may comprise up to about 10% builder, and in some examples up to about 8% builder, of the total weight of the composition. Granular compositions may comprise up to about 30% builder, and in some examples up to about 5% builder, by weight of the composition.

Builders selected from aluminosilicates (e.g., zeolite builders, such as zeolite A, zeolite P, and zeolite MAP) and silicates assist in controlling mineral hardness in wash water, especially calcium and/or magnesium, or to assist in the removal of particulate soils from surfaces. Suitable builders may be selected from the group consisting of phosphates, such as polyphosphates (e.g., sodium tri-polyphosphate), especially sodium salts thereof; carbonates, bicarbonates, sesquicarbonates, and carbonate minerals other than sodium carbonate or sesquicarbonate; organic mono-, di-, tri-, and tetracarboxylates, especially water-soluble nonsurfactant carboxylates in acid, sodium, potassium or alkanolammonium salt form, as well as oligomeric or water-soluble low molecular weight polymer carboxylates including aliphatic and aromatic types; and phytic acid. These may be complemented by borates, e.g., for pH-buffering purposes, or by sulfates, especially sodium sulfate and any other fillers or carriers which may be important to the engineering of stable surfactant and/or builder-containing compositions. Additional suitable builders may be selected from citric acid, lactic acid, fatty acid, polycarboxylate builders, for example, copolymers of acrylic acid, copolymers of acrylic acid and maleic acid, and copolymers of acrylic acid and/or maleic acid, and other suitable ethylenic monomers with various types of additional functionalities. Also suitable for use as builders herein are synthesized crystalline ion exchange materials or hydrates thereof having chain structure and a composition represented by the following general anhydride form: $x(M_2O) \cdot ySiO_2 \cdot zM'O$ wherein M is Na and/or K, M' is Ca and/or Mg; y/x is 0.5 to 2.0; and z/x is 0.005 to 1.0.

Alternatively, the composition may be substantially free of builder.

Structurant/Thickeners: Suitable structurant/thickeners include:
  i. Di-benzylidene Polyol Acetal Derivative
  ii. Bacterial Cellulose
  iii. Coated Bacterial Cellulose
  iv. Cellulose fibers non-bacterial cellulose derived
  v. Non-Polymeric Crystalline Hydroxyl-Functional Materials
  vi. Polymeric Structuring Agents
  vii. Di-amido-gellants
  viii. Any combination of above.

Polymeric Dispersing Agents: The composition may comprise one or more polymeric dispersing agents. Examples are carboxymethylcellulose, poly(vinylpyrrolidone), poly (ethylene glycol), poly(vinyl alcohol), poly(vinylpyridine-N-oxide), poly(vinylimidazole), polycarboxylates such as polyacrylates, maleic/acrylic acid copolymers and lauryl methacrylate/acrylic acid co-polymers.

The composition may comprise one or more amphiphilic cleaning polymers such as the compound having the following general structure: bis(($C_2H_5$O)($C_2H_4$O)n)($CH_3$)—$N^+$—$C_xH_{2x}$—$N^+$—($CH_3$)-bis(($C_2H_5$O)($C_2H_4$O)n), wherein n=from 20 to 30, and x=from 3 to 8, or sulphated or sulphonated variants thereof.

The composition may comprise amphiphilic alkoxylated grease cleaning polymers which have balanced hydrophilic and hydrophobic properties such that they remove grease particles from fabrics and surfaces. Specific embodiments of the amphiphilic alkoxylated grease cleaning polymers of the present invention comprise a core structure and a plurality of alkoxylate groups attached to that core structure. These may comprise alkoxylated polyalkylenimines, for example, having an inner polyethylene oxide block and an outer polypropylene oxide block.

Alkoxylated polyamines may be used for grease and particulate removal. Such compounds may include, but are not limited to, ethoxylated polyethyleneimine, ethoxylated hexamethylene diamine, and sulfated versions thereof. Polypropoxylated derivatives may also be included. A wide variety of amines and polyalkyeneimines can be alkoxylated to various degrees. A useful example is 600 g/mol polyethyleneimine core ethoxylated to 20 EO groups per NH and is available from BASF.

The composition may comprise random graft polymers comprising a hydrophilic backbone comprising monomers, for example, unsaturated $C_1$-$C_6$ carboxylic acids, ethers, alcohols, aldehydes, ketones, esters, sugar units, alkoxy units, maleic anhydride, saturated polyalcohols such as glycerol, and mixtures thereof; and hydrophobic side chain(s), for example, one or more $C_4$-$C_{25}$ alkyl groups, polypropylene, polybutylene, vinyl esters of saturated $C_1$-$C_6$ mono-carboxylic acids, $C_1$-$C_6$ alkyl esters of acrylic or methacrylic acid, and mixtures thereof. A specific example of such graft polymers based on polyalkylene oxides and vinyl esters, in particular vinyl acetate. These polymers are typically prepared by polymerizing the vinyl ester in the presence of the polyalkylene oxide, the initiator used being dibenzoyl peroxide, dilauroyl peroxide or diacetyl peroxide.

The composition may comprise blocks of ethylene oxide, propylene oxide. Examples of such block polymers include ethylene oxide-propylene oxide-ethylene oxide (EO/PO/EO) triblock copolymer, wherein the copolymer comprises a first EO block, a second EO block and PO block wherein the first EO block and the second EO block are linked to the PO block. Blocks of ethylene oxide, propylene oxide, butylene oxide can also be arranged in other ways, such as (EO/PO) deblock copolymer, (PO/EO/PO) triblock copolymer. The block polymers may also contain additional butylene oxide (BO) block.

Carboxylate polymer—The composition of the present invention may also include one or more carboxylate polymers such as a maleate/acrylate random copolymer or polyacrylate homopolymer. In one aspect, the carboxylate polymer is a polyacrylate homopolymer having a molecular weight of from 4,000 Da to 9,000 Da, or from 6,000 Da to 9,000 Da.

Soil Release Polymer: The compositions described herein may include from about 0.01% to about 10.0%, typically from about 0.1% to about 5%, in some aspects from about 0.2% to about 3.0%, by weight of the composition, of a soil release polymer (also known as a polymeric soil release agents or "SRA").

Soil release polymers typically have hydrophilic segments to hydrophilize the surface of hydrophobic fibers (such as polyester and nylon), and hydrophobic segments to deposit on hydrophobic fibers and remain adhered thereto through completion of washing and rinsing cycles, thereby serving as an anchor for the hydrophilic segments. This may enable stains occurring subsequent to treatment with a soil release agent to be more easily cleaned in later washing procedures. It is also believed that facilitating the release of soils helps to improve or maintain the wicking properties of a fabric.

The structure and charge distribution of the soil release polymer may be tailored for application to different fibers or textile types and for formulation in different detergent or detergent additive products. Soil release polymers may be linear, branched, or star-shaped.

Soil release polymers may also include a variety of charged units (e.g., anionic or cationic units) and/or non-charged (e.g., nonionic) monomer units. Typically, a non-ionic SRP may be particularly preferred when the SRP is used in combination with a cationic fabric conditioning active, such as a quaternary ammonium ester compound, in order to avoid potentially negative interactions between the SRP and the cationic active.

Soil release polymer may include an end capping moiety, which is especially effective in controlling the molecular weight of the polymer or altering the physical or surface-active properties of the polymer.

One preferred class of suitable soil release polymers include terephthalate-derived polyester polymers, which comprise structure unit (I) and/or (II):

(I) —[(OCHR$^1$—CHR$^2$)$_a$—O—OC—Ar—CO—]$_d$
(II) —[(OCHR$^3$—CHR$^4$)$_b$—O—OC—sAr—CO—]$_e$ wherein:
a, b are from 1 to 200;
d, e are from 1 to 50;
Ar is a 1,4-substituted phenylene;
sAr is 1,3-substituted phenylene substituted in position 5 with SO$_3$M;
M is a counterion selected from Na, Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;
R$^1$, R$^2$, R$^3$, R$^4$ are independently selected from H or $C_1$-$C_{18}$ n-alkyl or iso-alkyl;
Optionally, the polymer further comprises one or more terminal group (III) derived from polyalkylene glycolmonoalkylethers, preferably selected from structure (IV-a)

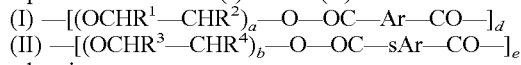
—O—[C$_2$H$_4$—O]$_c$—[C$_3$H$_6$—O]$_d$[C$_4$H$_8$—O]$_e$—R$_7$   (IV-a)

wherein:
R$_7$ is a linear or branched $C_1$-$C_{30}$ alkyl, $C_2$-$C_{30}$ alkenyl, or a cycloalkyl group with 5 to 9 carbon atoms, or a $C_8$-$C_{30}$ aryl group, or a $C_6$-$C_{30}$ arylalkyl group; preferably $C_1$-$C_4$ alkyl, more preferably methyl; and
c, d and e are, based on molar average, a number independently selected from 0 to 200, where the sum of c+d+e is from 2 to 500,
wherein the [C$_2$H$_4$—O], [C$_3$H$_6$—O] and [C$_4$H$_8$—O] groups of the terminal group (IV-a) may be arranged blockwise, alternating, periodically and/or statistically, preferably blockwise and/or statistically, either of the [C$_2$H$_4$—O], [C$_3$H$_6$—O] and [C$_4$H$_8$—O] groups of the terminal group (IV-a) can be linked to —R$_7$ and/or —O.

Optionally, the polymer further comprises one or more anionic terminal unit (IV) and/or (V) as described in EP3222647. Where M is a counterion selected from Na, Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof.

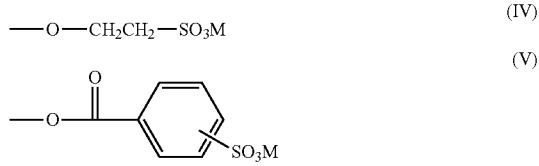

Optionally, the polymer may comprise crosslinking multifunctional structural unit which having at least three functional groups capable of the esterification reaction. The functional which may be for example acid-, alcohol-, ester-, anhydride- or epoxy groups, etc.

Optionally, the polymer may comprise other di- or polycarboxylic acids or their salts or their (di)alkylesters can be used in the polyesters of the invention, such as, naphthalene-1,4-dicarboxylic acid, naphthalene-2,6,-dicarboxylic acid, tetrahydrophthalic acid, trimellitic acid, diphenoxyethane-4,4'-dicarboxylic acid, diphenyl-4,4'-dicarboxylic acid, 2,5-furandicarboxylic acid, adipic acid, sebacic acid, decan-1,10-dicarboxylic acid, fumaric acid, succinic acid, 1,4-cyclohexanedicarboxylic acid, cyclohexanediacetic acid, glutaric acid, azelaic acid, or their salts or their (di)alkyl esters, preferably their ($C_1$-$C_4$)-(di)alkyl esters and more preferably their (di)methyl esters, or mixtures thereof.

Preferably, suitable terephthalate-derived soil release polymers are nonionic, which does not comprise above structure (II). A further particular preferred nonionic terephthalate-derived soil release polymer has a structure according to formula below:

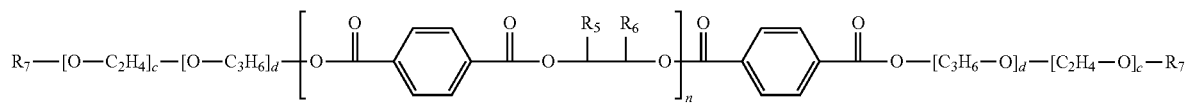

wherein:
$R_5$ and $R_6$ is independently selected from H or $CH_3$. More preferably, one of the $R_5$ and $R_6$ is H, and another is $CH_3$.

c, d are, based on molar average, a number independently selected from 0 to 200, where the sum of c+d is from 2 to 400, More preferably, d is from 0 to 50, c is from 1 to 200, More preferably, d is 1 to 10, c is 5 to 150, $R_7$ is $C_1$-$C_4$ alkyl and more preferably methyl, n is, based on molar average, from 1 to 50.

One example of most preferred above suitable terephthalate-derived soil release polymers has one of the $R_5$ and $R_6$ is H, and another is $CH_3$; d is 0; c is from 5-100 and $R_7$ is methyl.

Suitable terephthalate-derived soil release polymers may be also described as sulphonated and unsulphonated PET/POET (polyethylene terephthalate/polyoxyethylene terephthalate) polymers, both end-capped and non-end-capped. Example of suitable soil release polymers include TexCare® polymers, including TexCare® SRA-100, SRA-300, SRN-100, SRN-170, SRN-240, SRN-260, SRN-300, SRN UL50, and SRN-325, supplied by Clariant.

Other suitable terephthalate-derived soil release polymers are described in patent WO2014019903, WO2014019658 and WO2014019659.

Another class of soil release polymer also include modified cellulose. Suitable modified cellulose may include nonionic modified cellulose derivatives such as cellulose alkyl ether and cellulose hydroxyalkyl ethers. Example of such cellulose alkyl ether and cellulose hydroxyalkyl ethers include methyl cellulose, ethyl cellulose, hydroxyethyl cellulose, hydroxypropyl cellulose, hydroxypropyl methylcellulose, hydroxybutyl methyl cellulose. In some embodiment, the modified cellulose may comprise hydrocarbon of $C_4$ or above, preferred length of the alkyl group maybe $C_4$, $C_6$, $C_8$, $C_{10}$, $C_{12}$, $C_{14}$, $C_{16}$, $C_{18}$; example of suitable modified cellulose are described in WO2019111948 and WO2019111949. In some embodiment, the modified cellulose may comprise additional cationic modification, example of suitable modified cellulose with additional cationic modification are described in WO2019111946 and WO2019111947.

Other examples of commercial soil release polymers are the REPEL-O-TEX® line of polymers supplied by Rhodia, including REPEL-O-TEX® SF, SF-2, and SRP6. Other suitable soil release polymers are Marloquest® polymers, such as Marloquest® SL, HSCB, L235M, B, and G82, supplied by Sasol. Further suitable soil release polymers of a different type include the commercially available material ZELCON 5126 (from DuPont) and MILEASE T (from ICI), Sorez 100 (from ISP).

Cellulosic Polymer: The compositions described herein may include from about 0.1% to about 10%, typically from about 0.5% to about 7%, in some aspects from about 3% to about 5%, by weight of the composition, of a cellulosic polymer.

Suitable cellulosic polymers include alkyl cellulose, alkylalkoxyalkyl cellulose, carboxyalkyl cellulose, and alkyl carboxyalkyl cellulose. In some aspects, the cellulosic polymer is selected from carboxymethyl cellulose, methyl cellulose, methyl hydroxyethyl cellulose, methyl carboxymethyl cellulose, or mixtures thereof. In certain aspects, the cellulosic polymer is a carboxymethyl cellulose having a degree of carboxymethyl substitution of from about 0.5 to about 0.9 and a molecular weight from about 100,000 Da to about 300,000 Da.

Carboxymethylcellulose polymers include Finnfix® GDA (sold by CP Kelko), a hydrophobically modified carboxymethylcellulose, e.g., the alkyl ketene dimer derivative of carboxymethylcellulose sold under the tradename Finnfix® SH1 (CP Kelko), or the blocky carboxymethylcellulose sold under the tradename Finnfix® V (sold by CP Kelko).

Additional Amines: Additional amines may be used in the compositions described herein for added removal of grease and particulates from soiled materials. The compositions described herein may comprise from about 0.1% to about 10%, in some examples, from about 0.1% to about 4%, and in other examples, from about 0.1% to about 2%, by weight of the composition, of additional amines. Non-limiting examples of additional amines may include, but are not limited to, polyamines, oligoamines, triamines, diamines, pentamines, tetraamines, or combinations thereof. Specific examples of suitable additional amines include tetraethylenepentamine, triethylenetetraamine, diethylenetriamine, or a mixture thereof.

For example, alkoxylated polyamines may be used for grease and particulate removal. Such compounds may include, but are not limited to, ethoxylated polyethyleneimine, ethoxylated hexamethylene diamine, and sulfated versions thereof. Polypropoxylated derivatives may also be included. A wide variety of amines and polyalkyeneimines can be alkoxylated to various degrees. A useful example is 600 g/mol polyethyleneimine core ethoxylated to 20 EO groups per NH and is available from BASF. The compositions described herein may comprise from about 0.1% to about 10%, and in some examples, from about 0.1% to about 8%, and in other examples, from about 0.1% to about 6%, by weight of the composition, of alkoxylated polyamines.

Alkoxylated polycarboxylates may also be used in the compositions herein to provide grease removal. Chemically, these materials comprise polyacrylates having one ethoxy side-chain per every 7-8 acrylate units. The side-chains are of the formula —$(CH_2CH_2O)_m(CH_2)_nCH_3$ wherein m is 2-3 and n is 6-12. The side-chains are ester-linked to the polyacrylate "backbone" to provide a "comb" polymer type structure. The molecular weight can vary, but may be in the range of about 2000 to about 50,000. The compositions described herein may comprise from about 0.1% to about 10%, and in some examples, from about 0.25% to about 5%, and in other examples, from about 0.3% to about 2%, by weight of the composition, of alkoxylated polycarboxylates.

Bleaching Compounds, Bleaching Agents, Bleach Activators, and Bleach Catalysts: The compositions described herein may contain bleaching agents or bleaching compositions containing a bleaching agent and one or more bleach activators. Bleaching agents may be present at levels of from about 1% to about 30%, and in some examples from about 5% to about 20%, based on the total weight of the composition. If present, the amount of bleach activator may be from about 0.1% to about 60%, and in some examples from about 0.5% to about 40%, of the bleaching composition comprising the bleaching agent plus bleach activator.

Examples of bleaching agents include oxygen bleach, perborate bleach, percarboxylic acid bleach and salts thereof, peroxygen bleach, persulfate bleach, percarbonate bleach, and mixtures thereof.

In some examples, compositions may also include a transition metal bleach catalyst.

Bleaching agents other than oxygen bleaching agents are also known in the art and can be utilized in compositions. They include, for example, photoactivated bleaching agents, or pre-formed organic peracids, such as peroxycarboxylic acid or salt thereof, or a peroxysulphonic acid or salt thereof. A suitable organic peracid is phthaloylimidoperoxycaproic acid. If used, the compositions described herein will typically contain from about 0.025% to about 1.25%, by weight of the composition, of such bleaches, and in some examples, of sulfonate zinc phthalocyanine.

Brighteners: Optical brighteners or other brightening or whitening agents may be incorporated at levels of from about 0.01% to about 1.2%, by weight of the composition, into the compositions described herein. Commercial brighteners, which may be used herein, can be classified into subgroups, which include, but are not necessarily limited to, derivatives of stilbene, pyrazoline, coumarin, benzoxazoles, carboxylic acid, methinecyanines, dibenzothiophene-5,5-dioxide, azoles, 5- and 6-membered-ring heterocycles, and other miscellaneous agents.

In some examples, the fluorescent brightener is selected from the group consisting of disodium 4,4'-bis{[4-anilino-6-morpholino-s-triazin-2-yl]-amino}-2,2'-stilbenedisulfonate (brightener 15, commercially available under the tradename Tinopal AMS-GX by Ciba Geigy Corporation), disodium4,4'-bis{[4-anilino-6-(N-2-bis-hydroxyethyl)-s-triazine-2-yl]-amino}-2,2'-stilbenedisulonate (commercially available under the tradename Tinopal UNPA-GX by Ciba-Geigy Corporation), disodium 4,4'-bis{[4-anilino-6-(N-2-hydroxyethyl-N-methylamino)-s-triazine-2-yl]-amino}-2, 2'-stilbenedisulfonate (commercially available under the tradename Tinopal 5BM-GX by Ciba-Geigy Corporation). More preferably, the fluorescent brightener is disodium 4,4'-bis{[4-anilino-6-morpholino-s-triazin-2-yl]-amino}-2, 2'-stilbenedisulfonate.

The brighteners may be added in particulate form or as a premix with a suitable solvent, for example nonionic surfactant, monoethanolamine, propane diol.

Fabric Hueing Agents: The compositions may comprise a fabric hueing agent (sometimes referred to as shading, bluing or whitening agents). Typically, the hueing agent provides a blue or violet shade to fabric. Hueing agents can be used either alone or in combination to create a specific shade of hueing and/or to shade different fabric types. This may be provided for example by mixing a red and green-blue dye to yield a blue or violet shade. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Dye Transfer Inhibiting Agents: The compositions may also include one or more materials effective for inhibiting the transfer of dyes from one fabric to another during the cleaning process. Generally, such dye transfer inhibiting agents may include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents may be used at a concentration of about 0.0001% to about 10%, by weight of the composition, in some examples, from about 0.01% to about 5%, by weight of the composition, and in other examples, from about 0.05% to about 2% by weight of the composition.

Chelating Agents: The compositions described herein may also contain one or more metal ion chelating agents. Suitable molecules include copper, iron and/or manganese chelating agents and mixtures thereof. Such chelating agents can be selected from the group consisting of phosphonates, amino carboxylates, amino phosphonates, succinates, polyfunctionally-substituted aromatic chelating agents, 2-pyridinol-N-oxide compounds, hydroxamic acids, carboxymethyl inulins, and mixtures therein. Chelating agents can be present in the acid or salt form including alkali metal, ammonium, and substituted ammonium salts thereof, and mixtures thereof.

The chelant may be present in the compositions disclosed herein at from about 0.005% to about 15% by weight, about 0.01% to about 5% by weight, about 0.1% to about 3.0% by weight, or from about 0.2% to about 0.7% by weight, or from about 0.3% to about 0.6% by weight of the composition.

Aminocarboxylates useful as chelating agents include, but are not limited to ethylenediam in etetracetates (EDTA); N-(hydroxyethyl)ethyl enediam in etriacetates (HEDTA); nitrilotriacetates (NTA); ethylenediamine tetraproprionates; triethylenetetraam in eh exacetates, diethylenetriamine-pentaacetates (DTPA); methylglycinediacetic acid (MGDA); Glutamic acid diacetic acid (GLDA); ethanoldiglycines; tri ethyl en etetraam in eh exaacetic acid (TTHA); N-hydroxyethyliminodiaceticacid (HEIDA); dihydroxyethylglycine (DHEG); ethylenediaminetetrapropionic acid (EDTP) and derivatives thereof.

Encapsulates: The compositions may comprise an encapsulate. In some aspects, the encapsulate comprises a core, a shell having an inner and outer surface, where the shell encapsulates the core.

In certain aspects, the encapsulate comprises a core and a shell, where the core comprises a material selected from perfumes; brighteners; dyes; insect repellants; silicones; waxes; flavors; vitamins; fabric softening agents; skin care agents, e.g., paraffins; enzymes; anti-bacterial agents; bleaches; sensates; or mixtures thereof; and where the shell comprises a material selected from polyethylenes; polyamides; polyvinylalcohols, optionally containing other co-monomers; polystyrenes; polyisoprenes; polycarbonates; polyesters; polyacrylates; polyolefins; polysaccharides, e.g., alginate and/or chitosan; gelatin; shellac; epoxy resins; vinyl polymers; water insoluble inorganics; silicone; aminoplasts, or mixtures thereof. In some aspects, where the shell comprises an aminoplast, the aminoplast comprises polyurea, polyurethane, and/or polyureaurethane. The polyurea may comprise polyoxymethyleneurea and/or melamine formaldehyde.

Fabric and home care products are typically suitable for: (a) the care of finished textiles, cleaning of finished textiles, sanitization of finished textiles, disinfection of finished textiles, detergents, stain removers, softeners, fabric enhancers, stain removal or finished textiles treatments, pre and post wash treatments, washing machine cleaning and maintenance, with finished textiles intended to include garments and items made of cloth; (b) the care of dishes, glasses, crockery, cooking pots, pans, utensils, cutlery and the like in automatic, in-machine washing, including detergents, preparatory post treatment and machine cleaning and maintenance products for both the dishwasher, the utilized water and its contents; or (c) manual hand dish washing detergents.

The fabric and home care product typically comprises additional fabric and home care ingredients, such as those described in more detail above.

Liquid laundry detergent composition. The fabric and home care product can be a laundry detergent composition, such as a liquid laundry detergent composition. Suitable liquid laundry detergent compositions can comprise a non-soap surfactant, wherein the non-soap surfactant comprises an anionic non-soap surfactant and a non-ionic surfactant. The laundry detergent composition can comprise from 10% to 60%, or from 20% to 55% by weight of the laundry detergent composition of the non-soap surfactant. The non-soap anionic surfactant to nonionic surfactant are from 1:1 to 20:1, from 1.5:1 to 17.5:1, from 2:1 to 15:1, or from 2.5:1 to 13:1. Suitable non-soap anionic surfactants include linear alkylbenzene sulphonate, alkyl sulphate or a mixture thereof. The weight ratio of linear alkylbenzene sulphonate to alkyl sulphate can be from 1:2 to 9:1, from 1:1 to 7:1, from 1:1 to 5:1, or from 1:1 to 4:1. Suitable linear alkylbenzene sulphonates are $C_{10}$-$C_{16}$ alkyl benzene sulfonic acids, or $C_{11}$-$C_{14}$ alkyl benzene sulfonic acids. Suitable alkyl sulphate anionic surfactants include alkoxylated alkyl sulphates, non-alkoxylated alkyl sulphates, and mixture thereof. Preferably, the HLAS surfactant comprises greater than 50% $C_{12}$, preferably greater than 60%, preferably greater than 70% $C_{12}$, more preferably greater than 75% $C_{12}$. Suitable alkoxylated alkyl sulphate anionic surfactants include ethoxylated alkyl sulphate anionic surfactants. Suitable alkyl sulphate anionic surfactants include ethoxylated alkyl sulphate anionic surfactant with a mol average degree of ethoxylation of from 1 to 5, from 1 to 3, or from 2 to 3. The alkyl alkoxylated sulfate may have a broad alkoxy distribution or a peaked alkoxy distribution. The alkyl portion of the AES may include, on average, from 13.7 to about 16 or from 13.9 to 14.6 carbons atoms. At least about 50% or at least about 60% of the AES molecule may include having an alkyl portion having 14 or more carbon atoms, preferable from 14 to 18, or from 14 to 17, or from 14 to 16, or from 14 to 15 carbon atoms. The alkyl sulphate anionic surfactant may comprise a non-ethoxylated alkyl sulphate and an ethoxylated alkyl sulphate wherein the mol average degree of ethoxylation of the alkyl sulphate anionic surfactant is from 1 to 5, from 1 to 3, or from 2 to 3. The alkyl fraction of the alkyl sulphate anionic surfactant can be derived from fatty alcohols, oxo-synthesized alcohols, Guerbet alcohols, or mixtures thereof. Preferred alkyl sulfates include optionally ethoxylated alcohol sulfates including 2-alkyl branched primary alcohol sulfates especially 2-branched $C_{12}$-$C_{15}$ primary alcohol sulfates, linear primary alcohol sulfates especially linear $C_{12}$-$C_{14}$ primary alcohol sulfates, and mixtures thereof. The laundry detergent composition can comprise from 10% to 50%, or from 15% to 45%, or from 20% to 40%, or from 30% to 40% by weight of the laundry detergent composition of the non-soap anionic surfactant.

Suitable non-ionic surfactants can be selected from alcohol broad or narrow range alkoxylates, an oxo-synthesised alcohol alkoxylate, Guerbet alcohol alkoxylates, alkyl phenol alcohol alkoxylates, or a mixture thereof. The laundry detergent composition can comprise from 0.01% to 10%, from 0.01% to 8%, from 0.1% to 6%, or from 0.15% to 5% by weight of the liquid laundry detergent composition of a non-ionic surfactant.

The laundry detergent composition comprises from 1.5% to 20%, or from 2% to 15%, or from 3% to 10%, or from 4% to 8% by weight of the laundry detergent composition of soap, such as a fatty acid salt. Such soaps can be amine neutralized, for instance using an alkanolamine such as monoethanolamine.

The laundry detergent composition can comprises an adjunct ingredient selected from the group comprising builders including citrate, enzymes, bleach, bleach catalyst, dye, hueing dye, Leuco dyes, brightener, cleaning polymers including alkoxylated polyamines and polyethyleneimines, amphiphilic copolymers, soil release polymer, surfactant, solvent, dye transfer inhibitors, chelant, diamines, perfume, encapsulated perfume, polycarboxylates, structurant, pH trimming agents, antioxidants, antibacterial, antimicrobial agents, preservatives and mixtures thereof.

The laundry detergent composition can have a pH of from 2 to 11, or from 6.5 to 8.9, or from 7 to 8, wherein the pH of the laundry detergent composition is measured at a 10% product concentration in demineralized water at 20° C.

The liquid laundry detergent composition can be Newtonian or non-Newtonian, preferably non-Newtonian.

For liquid laundry detergent compositions, the composition can comprise from 5% to 99%, or from 15% to 90%, or from 25% to 80% by weight of the liquid detergent composition of water.

The detergent composition according to the invention can be liquid laundry detergent composition. The following are exemplary liquid laundry detergent formulations. Preferably the liquid laundry detergent composition comprises from between 0.1% and 4.0%, preferably between 0.5% and 3%, more preferably between 1% to 2.5% by weight of the detergent composition of the sulfatized esteramine according to the invention.

TABLE 1

| Raw Material | Comp. 1 % wt | Comp. 2 % wt | Comp. 3 % wt | Comp. 4 % wt |
|---|---|---|---|---|
| Branched Alkyl Sulfate | 0.0 | 5.3 | 0.0 | 5.3 |
| Sodium Lauryl Sulfate | 0.0 | 3.0 | 0.0 | 3.0 |
| Linear alkylbenzene sultanate | 18.0 | 5.0 | 6.0 | 5.0 |
| AE3S Ethoxylated alkyl sulphate with an average degree of ethoxylation of 3 | 5.0 | 0.0 | 1.3 | 0.0 |
| C25AES Ethoxylated alkyl sulphate with an average degree of ethoxylation of 2.5[1] | 0.0 | 3.0 | 1.4 | 0.0 |
| Amine oxide | 0.7 | 1.0 | 0.4 | 0.8 |
| C24 alkyl ethoxylate (EO7) | 8.4 | 0.0 | 12.9 | 5.0 |
| C24 alkyl ethoxylate (EO9) | 0.0 | 8.7 | 0.0 | 3.7 |
| C45 alkyl ethoxylate (EO7) | 0.0 | 2.7 | 0.0 | 2.7 |
| Citric acid | 2.9 | 2.3 | 0.7 | 2.3 |
| Palm kernel fatty acid | 0.0 | 1.0 | 0.0 | 1.0 |
| Topped kernel fatty acid | 2.9 | 0.0 | 2.3 | 0.0 |
| Mannanase | 0.0017 | 0.0017 | 0.0017 | 0.0017 |
| Pectawash | 0.00342 | 0.00342 | 0.00342 | 0.00342 |
| Amylase | 0.00766 | 0.00766 | 0.00766 | 0.00766 |
| Protease | 0.07706 | 0.07706 | 0.07706 | 0.07706 |
| Nuclease[3] | 0.010 | 0.01 | 0.01 | 0.01 |
| Sodium tetraborate | 0.0 | 1.7 | 0.0 | 1.7 |
| MEA-Boric Acid Salt | 0.0 | 0.0 | 0.8 | 0.0 |
| Calcium/sodium formate | 0.0 | 0.04 | 0.01 | 0.04 |
| Sodium/Calcium Chloride | 0.04 | 0.02 | 0.03 | 0.02 |
| Ethoxylated polyethyleneimine[2] | 0.0 | 2.0 | 1.1 | 2.0 |
| Amphiphilic graft copolymer | 1.5 | 0.0 | 0.0 | 0.0 |
| Ethoxylated-Propoxylated polyethyleneimine | 0.0 | 2.0 | 0.8 | 2.0 |
| Zwitterionic polyamine | 0.5 | 0.0 | 0.0 | 0.0 |
| Nonionic polyester terephthalate | 1.0 | 1.0 | 1.0 | 1.0 |
| Polymer of the present invention | 1.0 | 2.0 | 1.5 | 2.5 |
| DTPA | 0.0 | 0.1 | 0.2 | 0.1 |
| EDDS | 0.1 | 0.0 | 0.0 | 0.0 |
| GLDA | 0.4 | 0.3 | 0.1 | 0.0 |
| MGDA | 0.2 | 0.0 | 0.0 | 0.5 |
| Diethylene triamine penta(methyl phosphonic) acid (DTPMP) | 1.1 | 0.0 | 0.0 | 0.0 |
| Fluorescent Brightener[8] | 0.06 | 0.22 | 0.03 | 0.15 |
| Ethanol | 0.7 | 1.9 | 0.0 | 1.9 |
| propylene glycol | 5.5 | 5.5 | 0.33 | 5.5 |
| Sorbitol | 0.01 | 0.01 | 0.0 | 0.01 |
| Monoethanolamine | 0.2 | 0.2 | 0.6 | 0.2 |
| DETA | 0.1 | 0.08 | 0.0 | 0.08 |
| Antioxidant 1 | 0.0 | 0.1 | 0.1 | 0.1 |
| Antioxidant 2 | 0.1 | 0.0 | 0.0 | 0.0 |
| Hygiene Agent | 0.0 | 0.0 | 0.05 | 0.0 |
| NaOH | 4.7 | 4.7 | 1.1 | 4.7 |
| NaCS | 3.2 | 1.7 | 3.2 | 1.7 |
| Hydrogenated Castor Oil | 0.2 | 0.1 | 0.12 | 0.1 |
| Aesthetic dye | 0.10 | 0.01 | 0.006 | 0.01 |
| Leuco dye | 0.05 | 0.01 | 0.0 | 0.01 |
| Perfume | 2.0 | 1.3 | 0.5 | 1.3 |
| Perfume microcapsules | 0.5 | 0.05 | 0.1 | 0.05 |
| Silicone antifoam[7] | 0.02 | 0.01 | 0.0 | 0.01 |

TABLE 1-continued

| Raw Material | Comp. 1 % wt | Comp. 2 % wt | Comp. 3 % wt | Comp. 4 % wt |
|---|---|---|---|---|
| Phenyloxyethanol | 0.002 | 0.01 | 0.0 | 0.01 |
| Hueing dye | 0.01 | 0.1 | 0.05 | 0.1 |
| Water & miscellaneous | balance | balance | balance | balance |

Description of super-script numbers:
[1]C12-15EO2.5S AlkylethoxySulfate where the alkyl portion of AES includes from about 13.9 to 14.6 carbon atoms
[2]PE-20 commercially available from BASF
[3]Nuclease enzyme is as claimed in co-pending European application 19219568.3
4 Antioxidant 1 is 3,5-bis(1,1-dimethylethyl)-4-hydroxybenzenepropanoic acid, methyl ester [6386-38-5]
5 Antioxidant 2 is Tinogard TS commercially available from BASF
6 Hygiene Agent is agent is Tinosan HP 100 commercially available from BASF
[7]Dow Corning supplied antifoam blend 80-92% ethylmethyl, methyl(2-phenyl propyl)siloxane; 5-14% MQ Resin in octyl stearate a 3-7% modified silica.
[8]Fluorescent Brightener is disodium 4,4'-bis{[4-anilino-6-morpholino-s-triazin-2-yl]-amino}-2,2'-stilbenedisulfonate or 2,2'-([1,1'-Biphenyl]-4,4'-diyldi-2,1-ethenediyl)bis-benzenesulfonic acid disodium salt.

Water Soluble Unit Dose Article.

The fabric and home care product can be a water-soluble unit dose article. The water-soluble unit dose article comprises at least one water-soluble film orientated to create at least one unit dose internal compartment, wherein the at least one unit dose internal compartment comprises a detergent composition. The water-soluble film preferably comprises polyvinyl alcohol homopolymer or polyvinyl alcohol copolymer, for example a blend of polyvinylalcohol homopolymers and/or polyvinylalcohol copolymers, for example copolymers selected from sulphonated and carboxylated anionic polyvinylalcohol copolymers especially carboxylated anionic polyvinylalcohol copolymers, for example a blend of a polyvinylalcohol homopolymer and a carboxylated anionic polyvinylalcohol copolymer. In some examples water soluble films are those supplied by Monosol under the trade references M8630, M8900, M8779, M8310. The detergent product comprises a detergent composition, more preferably a laundry detergent composition. Preferably the laundry detergent composition enclosed in the water-soluble unit dose article comprises from between 0.1% and 8%, preferably between 0.5% and 7%, more preferably 1.0% to 6.0% by weight of the detergent composition of the sulfatized esteramine of the present invention. Preferably the soluble unit dose laundry detergent composition comprises a non-soap surfactant, wherein the non-soap surfactant comprises an anionic non-soap surfactant and a non-ionic surfactant. More preferably, the laundry detergent composition comprises between 10% and 60%, or between 20% and 55% by weight of the laundry detergent composition of the non-soap surfactant. The weight ratio of non-soap anionic surfactant to nonionic surfactant preferably is from 1:1 to 20:1, from 1.5:1 to 17.5:1, from 2:1 to 15:1, or from 2.5:1 to 13:1. The non-soap anionic surfactants preferably comprise linear alkylbenzene sulphonate, alkyl sulphate or a mixture thereof. The weight ratio of linear alkylbenzene sulphonate to alkyl sulphate preferably is from 1:2 to 9:1, from 1:1 to 7:1, from 1:1 to 5:1, or from 1:1 to 4:1. Example linear alkylbenzene sulphonates are $C_{10}$-$C_{16}$ alkyl benzene sulfonic acids, or $C_{11}$-$C_{14}$ alkyl benzene sulfonic acids. By 'linear', we herein mean the alkyl group is linear. Example alkyl sulphate anionic surfactant may comprise alkoxylated alkyl sulphate or non-alkoxylated alkyl sulphate or a mixture thereof. Example alkoxylated alkyl sulphate anionic surfactants comprise an ethoxylated alkyl sulphate anionic surfactant. Example alkyl sulphate anionic surfactant may comprise an ethoxylated alkyl sulphate anionic surfactant with a mol average degree of ethoxylation from 1 to 5, from 1 to 3, or from 2 to 3. Example alkyl sulphate anionic surfactant may comprise a non-ethoxylated alkyl sulphate and an ethoxylated alkyl sulphate wherein the mol average degree of ethoxylation of the alkyl sulphate anionic surfactant is from 1 to 5, from 1 to 3, or from 2 to 3. Example alkyl fraction of the alkyl sulphate anionic surfactant are derived from fatty alcohols, oxo-synthesized alcohols, Guerbet alcohols, or mixtures thereof. Preferably the laundry detergent composition comprises between 10% and 50%, between 15% and 45%, between 20% and 40%, or between 30% and 40% by weight of the laundry detergent composition of the non-soap anionic surfactant. In some examples, the non-ionic surfactant is selected from alcohol alkoxylate, an oxo-synthesised alcohol alkoxylate, Guerbet alcohol alkoxylates, alkyl phenol alcohol alkoxylates, or a mixture thereof. Preferably, the laundry detergent composition comprises between 0.01% and 10%, or between 0.01% and 8%, or between 0.1% and 6%, or between 0.15% and 5% by weight of the liquid laundry detergent composition of a non-ionic surfactant. Preferably, the laundry detergent composition comprises between 1.5% and 20%, between 2% and 15%, between 3% and 10%, or between 4% and 8% by weight of the laundry detergent composition of soap, in some examples a fatty acid salt, in some examples an amine neutralized fatty acid salt, wherein in some examples the amine is an alkanolamine preferably monoethanolamine. Preferably the liquid laundry detergent composition comprises less than 15%, or less than 12% by weight of the liquid laundry detergent composition of water. Preferably, the laundry detergent composition comprises between 10% and 40%, or between 15% and 30% by weight of the liquid laundry detergent composition of a non-aqueous solvent selected from 1,2-propanediol, dipropylene glycol, tripropyleneglycol, glycerol, sorbitol, polyethylene glycol or a mixture thereof. Preferably the liquid laundry detergent composition comprises from 0.1% to 10%, preferably from 0.5% to 8% by weight of the detergent composition of further soil release polymers, preferably selected from the group of nonionic and/or anionically modified polyester terephthalate soil release polymers such as commercially available under the Texcare brand name from Clariant, amphiphilic graft polymers such as those based on polyalkylene oxides and vinyl esters, polyalkoxylated polyethyleneimines, and mixtures thereof. Preferably the liquid detergent composition further comprises from 0.1% to 10% preferably from 1% to 5% of a chelant. In some examples, the laundry detergent composition comprises an adjunct ingredient selected from the group comprising builders including citrate, enzymes, bleach, bleach catalyst, dye, hueing dye, brightener, cleaning polymers including (zwitterionic) alkoxylated polyamines, surfactant, solvent, dye transfer inhibitors, perfume, encapsulated perfume, polycarboxylates, structurant, pH trimming agents, and mixtures thereof. Preferably, the laundry detergent composition has a pH between 6 and 10, between 6.5 and 8.9, or between 7 and 8, wherein the pH of the laundry detergent composition is measured as a 10% product concentration in demineralized water at 20° C. When liquid, the laundry detergent composition may be Newtonian or non-Newtonian, preferably non-Newtonian.

The following is an exemplary water soluble unit dose formulations. The composition can be part of a single chamber water soluble unit dose article or can be split over multiple compartments resulting in below "averaged across compartments" full article composition. The composition is enclosed within a polyvinyl alcohol based water soluble, the polyvinyl alcohol comprising a blend of a polyvinyl alcohol homopolymer and an anionic e.g. carboxylated polyvinyl alcohol copolymer.

TABLE 2

| Ingredients | Comp. 4 (wt %) |
|---|---|
| Fatty alcohol ethoxylate non-ionic surfactant, $C_{12-14}$ average degree of ethoxylation of 7 | 3.8 |
| Lutensol XL100 | 0.5 |
| Linear $C_{11-14}$ alkylbenzene sulphonate | 24.6 |
| AE3S Ethoxylated alkyl sulphate with an average degree of ethoxylation of 3 | 12.5 |
| Citric acid | 0.7 |
| Palm Kernel Fatty acid | 5.3 |
| Nuclease enzyme* (wt % active protein) | 0.01 |
| Protease enzyme (wt % active protein) | 0.07 |
| Amylase enzyme (wt % active protein) | 0.005 |
| Xyloglucanese enzyme (wt % active protein) | 0.005 |
| Mannanase enzyme (wt % active protein) | 0.003 |
| Ethoxylated polyethyleneimine (Lutensol FP620 - PEI600EO20) | 1.4 |
| Amphiphilic graft copolymer** | 1.6 |
| Zwitterionic polyamine (Lutensit Z96) | 1.5 |
| Anionic polyester terephthalate (Texcare SRA300) | 0.6 |
| Polymer of the present invention | 3.0 |
| HEDP | 2.2 |
| Brightener 49 | 0.4 |
| Silicone anti-foam | 0.3 |
| Hueing dye | 0.05 |
| 1,2 PropaneDiol | 11.0 |
| Glycerine | 4.7 |
| DPG (DiPropyleneGlycol) | 1.7 |
| TPG (TriPropyleneGlycol) | 0.1 |
| Sorbitol | 0.1 |
| Monoethanolamine | 10.2 |
| $K_2SO_3$ | 0.4 |
| $MgCl_2$ | 0.3 |
| water | 10.5 |
| Hydrogenated castor oil | 0.1 |
| Perfume | 2.1 |
| Aesthetic dye & Minors | Balance to 100 |
| pH (10% product concentration in demineralized water at 20° C.) | 7.4 |

Description of super-scripts:
*Nuclease enzyme is as claimed in co-pending European application 19219568.3
**polyethylene glycol graft polymer comprising a polyethylene glycol backbone (Pluriol E6000) and hydrophobic vinyl acetate side chains, comprising 40% by weight of the polymer system of a polyethylene glycol backbone polymer and 60% by weight of the polymer system of the grafted vinyl acetate side chains Hand Dishwashing Liquid Composition.

The fabric and home care product can be a dishwashing detergent composition, such as a hand dishwashing detergent composition, more preferably a liquid hand dishwashing detergent composition. Preferably the liquid hand dishwashing detergent composition comprises from between 0.1% and 5.0%, preferably between 0.5% and 4%, more preferably 1.0% to 3.0% by weight of the detergent composition of the sulfatized esteramine of the present invention. The liquid hand-dishwashing detergent composition preferably is an aqueous composition, comprising from 50% to 90%, preferably from 60% to 75%, by weight of the total composition of water. Preferably the pH of the detergent composition of the invention, measured as a 10% product concentration in demineralized water at 20° C., is adjusted to between 3 and 14, more preferably between 4 and 13, more preferably between 6 and 12 and most preferably between 8 and 10. The composition of the present invention can be Newtonian or non-Newtonian, preferably Newtonian. Preferably, the composition has a viscosity of from 10 mPa·s to 10,000 mPa·s, preferably from 100 mPa·s to 5,000 mPa·s, more preferably from 300 mPa·s to 2,000 mPa·s, or most preferably from 500 mPa·s to 1,500 mPa·s, alternatively combinations thereof. The viscosity is measured at 20° C. with a Brookfield RT Viscometer using spindle 31 with the RPM of the viscometer adjusted to achieve a torque of between 40% and 60%.

The composition comprises from 5% to 50%, preferably from 8% to 45%, more preferably from 15% to 40%, by weight of the total composition of a surfactant system. The surfactant system preferably comprises from 60% to 90%, more preferably from 70% to 80% by weight of the surfactant system of an anionic surfactant. Alkyl sulphated anionic surfactants are preferred, particularly those selected from the group consisting of: alkyl sulphate, alkyl alkoxy sulphate preferably alkyl ethoxy sulphate, and mixtures thereof. The alkyl sulphated anionic surfactant preferably has an average alkyl chain length of from 8 to 18, preferably from 10 to 14, more preferably from 12 to 14, most preferably from 12 to 13 carbon atoms. The alkyl sulphated anionic surfactant preferably has an average degree of alkoxylation preferably ethoxylation, of less than 5, preferably less than 3, more preferably from 0.5 to 2.0, most preferably from 0.5 to 0.9. The alkyl sulphate anionic surfactant preferably has a weight average degree of branching of more than 10%, preferably more than 20%, more preferably more than 30%, even more preferably between 30% and 60%, most preferably between 30% and 50%. Suitable counterions include alkali metal cation earth alkali metal cation, alkanolammonium or ammonium or substituted ammonium, but preferably sodium. Suitable examples of commercially available alkyl sulphate anionic surfactants include, those derived from alcohols sold under the Neodol® brand-name by Shell, or the Lial®, Isalcheme, and Safol® brand-names by Sasol, or some of the natural alcohols produced by The Procter & Gamble Chemicals company.

The surfactant system preferably comprises from 0.1% to 20%, more preferably from 0.5% to 15% and especially from 2% to 10% by weight of the liquid hand dishwashing detergent composition of a co-surfactant. Preferred co-surfactants are selected from the group consisting of an amphoteric surfactant, a zwitterionic surfactant, and mixtures thereof. The anionic surfactant to the co-surfactant weight ratio can be from 1:1 to 8:1, preferably from 2:1 to 5:1, more preferably from 2.5:1 to 4:1. The co-surfactant is preferably an amphoteric surfactant, more preferably an amine oxide surfactant.

Preferably, the amine oxide surfactant is selected from the group consisting of: alkyl dimethyl amine oxide, alkyl amido propyl dimethyl amine oxide, and mixtures thereof, most preferably $C_{12}$-$C_{14}$ alkyl dimethyl amine oxide. Suitable zwitterionic surfactants include betaine surfactants, preferably cocamidopropyl betaine. Preferably, the surfactant system of the composition of the present invention further comprises from 1% to 25%, preferably from 1.25% to 20%, more preferably from 1.5% to 15%, most preferably from 1.5% to 5%, by weight of the surfactant system, of a non-ionic surfactant. Suitable nonionic surfactants can be selected from the group consisting of: alkoxylated non-ionic surfactant, alkyl polyglucoside ("APG") surfactant, and mixtures thereof. Suitable alkoxylated non-ionic surfactants can be linear or branched, primary or secondary alkyl alkoxylated preferably alkyl ethoxylated non-ionic surfactants comprising on average from 9 to 15, preferably from 10 to 14 carbon atoms in its alkyl chain and on average from 5 to 12, preferably from 6 to 10, most preferably from 7 to 8, units of ethylene oxide per mole of alcohol. Most preferably, the alkyl polyglucoside surfactant has an average alkyl carbon chain length between 10 and 16, preferably between 10 and 14, most preferably between 12 and 14, with an average degree of polymerization of between 0.5 and 2.5 preferably between 1 and 2, most preferably between 1.2 and 1.6. $C_8$-$C_{16}$ alkyl polyglucosides are commercially available from several suppliers (e.g., Simusol® surfactants from Seppic Corporation; and Glucopon® 600 CSUP, Glucopon® 650 EC, Glucopon® 600 CSUP/MB, and Glucopon® 650 EC/MB, from BASF Corporation).

The liquid hand dishwashing detergent composition herein may optionally comprise a number of other adjunct ingredients such as builders (e.g., preferably citrate), chelants (e.g., preferably GLDA), conditioning polymers, cleaning polymers including polyalkoxylated polyalkylene imines, surface modifying polymers, soil flocculating polymers, sudsing polymers including EO-PO-EO triblock copolymers, grease cleaning amines including cyclic polyamines, structurants, emollients, humectants, skin rejuvenating actives, enzymes, carboxylic acids, scrubbing particles, bleach and bleach activators, perfumes, malodor control agents, pigments, dyes, opacifiers, beads, pearlescent particles, microcapsules, organic solvents, inorganic cations such as alkaline earth metals such as Ca/Mg-ions, antibacterial agents, preservatives, viscosity adjusters (e.g., salt such as NaCl, and other mono-, di- and trivalent salts) and pH adjusters and buffering means (e.g. carboxylic acids such as citric acid, HCl, NaOH, KOH, alkanolamines, phosphoric and sulfonic acids, carbonates such as sodium carbonates, bicarbonates, sesquicarbonates, borates, silicates, phosphates, imidazole and alike).

The following is an exemplary liquid hand dishwashing detergent formulation. The formulation can be made through standard mixing of the individual components.

TABLE 3

| As 100% active | Comp. 5 (wt %) |
|---|---|
| C1213AE0.6S anionic surfactant (Avg. branching: 37.84%) | 19.6 |
| C1214 dimethyl amine oxide | 6.5 |
| Alcohol ethoxylate nonionic surfactant (Neodol 91/8) | 1.0 |
| Alkoxylated polyethyleneimine (PEI600EO24PO16) | 0.2 |
| Polymer of the present invention | 0.1-3.0 |
| Ethanol | 2.4 |
| NaCl | 0.7 |
| Polypropyleneglycol (MW2000) | 0.9 |
| Water + Minor ingredients (perfume, dye, preservatives) | Balance to 100 |
| pH (at 10% product concentration in demineralized water - with NaOH trimming) | 9.0 |

Solid Free-Flowing Particulate Laundry Detergent Composition.

The fabric and home care product can be solid free-flowing particulate laundry detergent composition. The following is an exemplary solid free-flowing particulate laundry detergent composition.

TABLE 4

| Ingredient | Comp. 6 (wt %) |
|---|---|
| Anionic detersive surfactant (such as alkyl benzene sulphonate, alkyl ethoxylated sulphate and mixtures thereof) | from 8 wt % to 15 wt % |
| Non-ionic detersive surfactant (such as alkyl ethoxylated alcohol) | from 0.1 wt % to 4 wt % |
| Cationic detersive surfactant (such as quaternary ammonium compounds) | from 0 wt % to 4 wt % |
| Other detersive surfactant (such as zwiterionic detersive surfactants, amphoteric surfactants and mixtures thereof) | from 0 wt % to 4 wt % |
| Carboxylate polymer (such as co-polymers of maleic acid and acrylic acid and/or carboxylate polymers comprising ether moieties and sulfonate moieties) | from 0.1 wt % to 4 wt % |
| Polyethylene glycol polymer (such as a polyethylene glycol polymer comprising polyvinyl acetate side chains) | from 0 wt % to 4 wt % |
| Polyester soil release polymer (such as Repel-o-tex and/or Texcare polymers) | from 0 wt % to 2 wt % |
| Cellulosic polymer (such as carboxymethyl cellulose, methyl cellulose and combinations thereof) | from 0.5 wt % to 2 wt % |
| Polymer of the present invention | From 0.1 wt % to 4 wt % |
| Other polymer (such as care polymers) | from 0 wt % to 4 wt % |
| Zeolite builder and phosphate builder (such as zeolite 4A and/or sodium tripolyphosphate) | from 0 wt % to 4 wt % |
| Other co-builder (such as sodium citrate and/or citric acid) | from 0 wt % to 3 wt % |
| Carbonate salt (such as sodium carbonate and/or sodium bicarbonate) | from 0 wt % to 20 wt % |
| Silicate salt (such as sodium silicate) | from 0 wt % to 10 wt % |
| Filler (such as sodium sulphate and/or bio-fillers) | from 10 wt % to 70 wt % |
| Source of hydrogen peroxide (such as sodium percarbonate) | from 0 wt % to 20 wt % |
| Bleach activator (such as tetraacetylethylene diamine (TAED) and/or nonanoyloxybenzenesulphonate (NOBS)) | from 0 wt % to 8 wt % |
| Bleach catalyst (such as oxaziridinium-based bleach catalyst and/or transition metal bleach catalyst) | from 0 wt % to 0.1 wt % |
| Other bleach (such as reducing bleach and/or pre-formed peracid) | from 0 wt % to 10 wt % |
| Photobleach (such as zinc and/or aluminium sulphonated phthalocyanine) | from 0 wt % to 0.1 wt % |
| Chelant (such as ethylenediamine-N'N'-disuccinic acid (EDDS) and/or hydroxyethane diphosphonic acid (HEDP)) | from 0.2 wt % to 1 wt % |
| Hueing agent (such as direct violet 9, 66, 99, acid red 50, solvent violet 13 and any combination thereof) | from 0 wt % to 1 wt % |
| Brightener (C.I. fluorescent brightener 260 or C.I. fluorescent brightener 351) | from 0.1 wt % to 0.4 wt % |
| Protease (such as Savinase, Savinase Ultra, Purafect, FN3, FN4 and any combination thereof) | from 0.1 wt % to 0.4 wt % |
| Amylase (such as Termamyl, Termamyl ultra, Natalase, Optisize, Stainzyme, Stainzyme Plus and any combination thereof) | from 0 wt % to 0.2 wt % |
| Cellulase (such as Carezyme and/or Celluclean) | from 0 wt % to 0.2 wt % |
| Lipase (such as Lipex, Lipolex, Lipoclean and any combination thereof) | from 0 wt % to 1 wt % |
| Other enzyme (such as xyloglucanase, cutinase, pectate lyase, mannanase, bleaching enzyme) | from 0 wt % to 2 wt % |
| Fabric softener (such as montmorillonite clay and/or polydimethylsiloxane (PDMS)) | from 0 wt % to 15 wt % |
| Flocculant (such as polyethylene oxide) | from 0 wt % to 1 wt % |

TABLE 4-continued

| Ingredient | Comp. 6 (wt %) |
|---|---|
| Suds suppressor (such as silicone and/or fatty acid) | from 0 wt % to 4 wt % |
| Perfume (such as perfume microcapsule, spray-on perfume, starch encapsulated perfume accords, perfume loaded zeolite, and any combination thereof) | from 0.1 wt % to 1 wt % |
| Aesthetics (such as coloured soap rings and/or coloured speckles/noodles) | from 0 wt % to 1 wt % |
| Miscellaneous | balance to 100 wt % |

Method of Use

The present invention includes a method for cleaning a targeted surface. As used herein "targeted surface" may include such surfaces such as fabric, dishes, glasses, and other cooking surfaces, hard surfaces, hair or skin. As used herein "hard surface" includes hard surfaces being found in a typical home such as hard wood, tile, ceramic, plastic, leather, metal, glass. Such method includes the steps of contacting the composition comprising the modified polyol compound, in neat form or diluted in wash liquor, with at least a portion of a targeted surface then optionally rinsing the targeted surface. Preferably the targeted surface is subjected to a washing step prior to the aforementioned optional rinsing step. For purposes of the present invention, washing includes, but is not limited to, scrubbing, wiping and mechanical agitation.

As will be appreciated by one skilled in the art, the cleaning compositions of the present invention are ideally suited for use in home care (hard surface cleaning compositions) and/or laundry applications.

The composition solution pH is chosen to be the most complimentary to a target surface to be cleaned spanning broad range of pH, from about 3 to about 11. For personal care such as skin and hair cleaning pH of such composition preferably has a pH from about 5 to about 8 for laundry cleaning compositions pH of from about 5 to about 11. The compositions are preferably employed at concentrations of from about 200 ppm to about 10,000 ppm in solution. The water temperatures preferably range from about 5° C. to about 100° C.

For use in laundry cleaning compositions, the compositions are preferably employed at concentrations from about 200 ppm to about 10000 ppm in solution (or wash liquor). The water temperatures preferably range from about 5° C. to about 60° C. The water to fabric ratio is preferably from about 1:1 to about 20:1.

The method may include the step of contacting a nonwoven substrate impregnated with an embodiment of the composition of the present invention. As used herein "nonwoven substrate" can comprise any conventionally fashioned nonwoven sheet or web having suitable basis weight, caliper (thickness), absorbency and strength characteristics. Examples of suitable commercially available nonwoven substrates include those marketed under the tradename SONTARA® by DuPont and POLYWEB® by James River Corp.

As will be appreciated by one skilled in the art, the cleaning compositions of the present invention are ideally suited for use in liquid dish cleaning compositions. The method for using a liquid dish composition of the present invention comprises the steps of contacting soiled dishes with an effective amount, typically from about 0.5 ml. to about 20 ml. (per 25 dishes being treated) of the liquid dish cleaning composition of the present invention diluted in water.

EXAMPLES

Synthesis Examples

The following examples have been performed with the shown results obtained (also see Table 5), following the described procedures:

Example 1

HMDA+1 PO per mol of NH functionality+0.25 Caprolactone per mol of NH functionality+8 PO per mol of NH functionality (HMDA+1 PO/NH+0.25 Caprolacton/NH+8 PO/NH)

Example 1 a: HMDA+1 PO per mol of NH Functionality

A 2 l autoclave was charged with 245.0 g hexamethylene diamine and 12.3 g water. The reactor was purged three times with nitrogen and heated to 110° C. 489.8 g propylene oxide was added within 10 hours. To complete the reaction, the reaction mixture was allowed to post-react for 5 hours at 110° C. Volatile compounds were removed in vacuo at 90° C. A viscous yellow oil (730.0 g) was obtained. $^1$H-NMR in $CDCl_3$ indicated complete conversion.

Example 1 b: HMDA+1 PO per mol of NH Functionality+0.25 Caprolactone per mol of NH Functionality In a 3-neck reaction vessel with stirrer, thermometer, dropping funnel, and reflux cooler 278.8 g hexamethylene diamine+1 PO per mol of NH functionality (example 1 a) were placed and heated to 110° C. 91.3 g caprolactone was added within 10 minutes. The reaction mixture was heated to 160° C. and was stirred for 8 hours at 160° C. 370.0 g of a brown viscous oil was obtained. $^1$H-NMR in MeOD indicated complete conversion of caprolactone.

Example 1 c: HMDA+1 PO per mol of NH Functionality+0.25 Caprolactone per mol of NH Functionality+8 PO per mol of NH Functionality In a 2 l autoclave 185.1 g hexamethylene diamine+1 PO per mol of NH functionality+0.25 caprolactone per mol of NH functionality (example 1 b) and 1.9 g potassium tert. butoxide were placed and the mixture was heated to 140° C. The vessel was purged three times with nitrogen. 743.4 g propylene oxide was added in portions within 12 hours. To complete the reaction, the mixture was allowed to post-react for additional 5 hours at 140° C. The reaction mixture was stripped with nitrogen and volatile compounds are removed in vacuo at 90° C. for 2 hours. 927.0 g of a light brown oil was obtained. Identity was confirmed by $^1$H-NMR in $CDCl_3$.

Example 2

HMDA+1 PO per mol of NH functionality+0.5 Caprolactone per mol of NH functionality+8 PO per mol of NH functionality.

(HMDA+1 PO/NH+0.5 Caprolacton/NH+8 PO/NH)

Example 2 a: HMDA+1 PO per mol of NH Functionality+0.5 Caprolactone per mol of NH Functionality In a 3-neck reaction vessel with stirrer, thermometer, dropping funnel, and reflux cooler 139.4 g hexamethylene diamine +1 PO per mol of NH functionality (example 1 a) were placed and heated to 70° C. 91.3 g caprolactone was added within 15 minutes. The reaction mixture was heated to 160° C. and was stirred for 8 hours at 160° C. 223.0 g of an orange viscous oil is obtained. $^1$H-NMR in MeOD indicated complete conversion of caprolactone.

Example 2 b: HMDA+1 PO per mol of NH Functionality+0.5 Caprolactone per mol of NH Functionality+8 PO per mol of NH Functionality In a 2 l autoclave 115.4 g hexamethylene diamine+1 PO per mol of NH functionality+0.5 caprolactone per mol of NH functionality (example 2a) and 1.0 g potassium tert. butoxide were placed and the mixture was heated to 140° C. The vessel was purged three times with nitrogen. 371.7 g propylene oxide was added in portions within 6 hours. To complete the reaction, the mixture was allowed to post-react for additional 5 hours at 140° C. The reaction mixture was stripped with nitrogen and volatile compounds are removed in vacuo at 90° C. for 2 hours. 490.0 g of a light brown oil was obtained. Identity was confirmed by $^1$H-NMR in CDCl$_3$.

Example 3

EDA+1 PO per mol of NH functionality+0.25 Caprolactone per mol of NH functionality+8 PO per mol of NH functionality.

(EDA+1 PO/NH+0.25 Caprolacton/NH+8 PO/NH)

Example 3 a: EDA+1 PO per mol of NH Functionality+0.25 Caprolactone per mol of NH Functionality In a 3-neck reaction vessel with stirrer, thermometer, dropping funnel, and reflux cooler 146.2 g ethylene diamine+1 PO per mol of NH functionality (Quadrol L, purchased from BASF) were placed and heated to 40° C. 57.1 g caprolactone was added within 5 minutes. The reaction mixture was heated to 160° C. and was stirred for 8 hours at 160° C. 202.0 g of an orange viscous oil was obtained. $^1$H-NMR in MeOD indicated 98.5% conversion of caprolactone.

Example 3 b: EDA+1 PO per mol of NH Functionality+0.25 Caprolactone per mol of NH Functionality+8 PO per mol of NH Functionality In a 2 l autoclave 101.6 g ethylene diamine+1 PO per mol of NH functionality+0.25 caprolactone per mol of NH functionality (example 3 a) and 1.1 g potassium tert. butoxide were placed and the mixture was heated to 140° C. The vessel was purged three times with nitrogen. 464.6 g propylene oxide was added in portions within 8 hours. To complete the reaction, the mixture was allowed to post-react for additional 5 hours at 140° C. The reaction mixture was stripped with nitrogen and volatile compounds were removed in vacuo at 90° C. for 2 hours. 570.0 g of a light brown oil was obtained. Identity was confirmed by $^1$H-NMR in CDCl$_3$.

Example 4

HMDA+1 EO per mol of NH functionality+0.25 Caprolactone per mol of NH functionality+8 PO per mol of NH functionality.

(HMDA+1 EO/NH+0.25 Caprolacton/NH+8 PO/NH)

Example 4 a: HMDA+1 EO per mol of NH Functionality

A 2 l autoclave was charged with 348.6 g hexamethylene diamine and 17.4 g water. The reactor was purged three times with nitrogen and heated to 90° C. 528.6 g ethylene oxide was added within 10 hours. To complete the reaction, the reaction mixture was allowed to post-react for 5 hours at 90° C. Volatile compounds were removed in vacuo at 90° C. A beige wax (875.0 g) was obtained. $^1$H-NMR in CDCl$_3$ indicated complete conversion.

Example 4 b: HMDA+1 EO per mol of NH Functionality+0.25 Caprolactone per mol of NH Functionality In a 3-neck reaction vessel with stirrer, thermometer, dropping funnel and reflux cooler 263.2 g hexamethylene diamine+1 EO per mol of NH functionality (example 4 a) were placed and heated to 80° C. 102.7 g caprolactone were added in one portion at 80° C. The reaction mixture was heated to 160° C. and was stirred for 13 hours at 160° C. 360.0 g of a brown oil was obtained. 1H-NMR in MeOD indicated 93% conversion of caprolactone.

Example 4 c: HMDA+1 EO per mol of NH Functionality+0.25 Caprolactone per mol of NH Functionality+8 PO per mol of NH Functionality In a 2 l autoclave 162.6 g hexamethylene diamine+1 EO per mol of NH functionality+0.25 caprolactone per mol of NH functionality (example 4 b) and 1.9 g potassium tert. butoxide were placed and the mixture was heated to 140° C. The vessel was purged three times with nitrogen. 743.4 g propylene oxide was added in portions within 12 hours. To complete the reaction, the mixture was allowed to post-react for additional 5 hours at 140° C. The reaction mixture was stripped with nitrogen and volatile compounds were removed in vacuo at 90° C. for 2 hours. 895.0 g of a light brown oil was obtained. Identity was confirmed by $^1$H-NMR in CDCl$_3$.

Example 5

HMDA+1 EO per mol of NH functionality+0.5 Caprolactone per mol of NH functionality+8 PO per mol of NH functionality.

(HMDA+1 EO/NH+0.5 Caprolacton/NH+8 PO/NH)

Example 5 a: HMDA+1 EO per mol of NH Functionality+0.5 Caprolactone per mol of NH Functionality In a 3-neck reaction vessel with stirrer, thermometer, dropping funnel and reflux cooler 131.6 g hexamethylene diamine+1 EO per mol of NH functionality (example 4 a) were placed and heated to 70° C. 102.7 g caprolactone were added within 5 minutes. The reaction mixture was heated to 160° C. and was stirred for 8 hours at 160° C. 227.6 g of a dark brown oil was obtained. $^1$H-NMR in MeOD indicated 94% conversion of caprolactone.

Example 5 b: HMDA+1 EO per mol of NH Functionality+0.5 Caprolactone per mol of NH Functionality+8 PO per mol of NH Functionality In a 2 l autoclave 134.0 g hexamethylene diamine+1 EO per mol of NH functionality +0.5 caprolactone per mol of NH functionality (example 5 a) and 1.2 g potassium tert. butoxide were placed and the mixture was heated to 140° C. The vessel was purged three times with nitrogen. 478.3 g propylene oxide was added in portions within 8 hours. To complete the reaction, the mixture was allowed to post-react for additional 5 hours at 140° C. The reaction mixture was stripped with nitrogen and volatile compounds were removed in vacuo at 90° C. for 2 hours. 610.0 g of a light brown oil was obtained. Identity was confirmed by $^1$H-NMR in CDCl$_3$.

Example 6

PDA+1 PO per mol of NH functionality+0.25 Caprolactone per mol of NH functionality+8 PO per mol of NH functionality.

(PDA+1 PO/NH+0.25 Caprolacton/NH+8 PO/NH)

Example 6 a: PDA+1 PO per mol of NH Functionality

A 2 l autoclave was charged with 222.4 g 1,3-propane diamine and 11.2 g water. The reactor was purged three times with nitrogen and heated to 110° C. 697.0 g propylene oxide was added within 10 hours. To complete the reaction, the reaction mixture was allowed to post-react for 5 hours at 110° C. Volatile compounds were removed in vacuo at 90° C. A viscous light brown oil (919.0 g) was obtained. $^1$H-NMR in CDCl$_3$ indicated complete conversion.

Example 6 b: PDA+1 PO per mol of NH Functionality+0.25 Caprolactone per mol of NH Functionality In a 3-neck reaction vessel with stirrer, thermometer, dropping funnel, and reflux cooler 306.4 g 1,3-propane diamine+1 PO per mol of NH functionality (example 6 a) were placed and heated to 50° C. 114.1 g caprolactone was added within 50 minutes. The reaction mixture was heated to 160° C. and was stirred for 4 hours at 160° C. 420 g of a brown viscous oil was obtained. $^1$H-NMR in MeOD indicated complete conversion of caprolactone.

Example 6 c: PDA+1 PO per mol of NH Functionality+0.25 Caprolactone per mol of NH Functionality+8 PO per mol of NH Functionality In a 2 l autoclave 168.2 g 1,3-propane diamine+1 PO per mol of NH functionality+0.25 caprolactone per mol of NH functionality (example 6 b) and 1.8 g potassium tert. butoxide were placed and the mixture was heated to 140° C. The vessel was purged three times with nitrogen. 743.4 g propylene oxide was added in portions within 12 hours. To complete the reaction, the mixture was allowed to post-react for additional 5 hours at 140° C. The reaction mixture was stripped with nitrogen and volatile compounds were removed in vacuo at 90° C. for 2 hours. 915.0 g of a light brown oil was obtained. Identity was confirmed by $^1$H-NMR in CDCl$_3$.

Example 7

N4 amine+1 PO per mol of NH functionality+0.33 Caprolactone per mol of NH functionality+8 PO per mol of NH functionality.

(N4 amine+1 PO/NH+0.33 Caprolacton/NH+10.7 PO/NH)

Example 7 a: N4 Amine+1 PO per mol of NH Functionality

A 2 l autoclave was charged with 261.4 g N4 amine (N,N-bis(3-aminopropyl) ethylene diamine) and 13.0 g water. The reactor was purged three times with nitrogen and heated to 110° C. 522.7 g propylene oxide was added within 10 hours. To complete the reaction, the reaction mixture was allowed to post-react for 5 hours at 110° C. Volatile compounds were removed in vacuo at 90° C. A viscous light brown oil (784.0 g) was obtained. $^1$H-NMR in CDCl$_3$ indicated complete conversion.

Example 7 b: N4 Amine+1 PO per mol of NH Functionality+0.33 Caprolactone per mol of NH Functionality In a 3-neck reaction vessel with stirrer, thermometer, dropping funnel, and reflux cooler 200.0 g N4 amine+1 PO per mol of NH functionality (example 7 a) were placed and heated to 50° C. 87.4 g caprolactone was added within 50 minutes. The reaction mixture was heated to 160° C. and was stirred for 5 hours at 160° C. 420 g of a brown viscous oil was obtained. $^1$H-NMR in MeOD indicated 96% conversion of caprolactone.

Example 7 c: N4 Amine+1 PO per mol of NH Functionality+ 0.33 Caprolactone per mol of NH Functionality+8 PO per mol of NH Functionality In a 2 l autoclave 150.2 g N4 amine+1 PO per mol of NH functionality+0.33 caprolactone per mol of NH functionality (example 7 b) and 1.0 g potassium tert. butoxide were placed and the mixture was heated to 140° C. The vessel was purged three times with nitrogen. 743.4 g propylene oxide was added in portions within 12 hours. To complete the reaction, the mixture was allowed to post-react for additional 5 hours at 140° C. The reaction mixture was stripped with nitrogen and volatile compounds were removed in vacuo at 90° C. for 2 hours. 900.0 g of a light brown oil was obtained. Identity was confirmed by $^1$H-NMR in CDCl$_3$.

Example 8

EDA+1 EO per mol of NH functionality+0.25 Caprolactone per mol of NH functionality+8 PO per mol of NH functionality.

(EDA+1 EO/NH+0.25 Caprolacton/NH+8 PO/NH)

Example 8 a: EDA+1 EO per mol of NH Functionality

A 2 l autoclave was charged with 199.0 g ethylene diamine and 9.9 g water. The reactor was purged three times with nitrogen and heated to 110° C. 583.4 g ethylene oxide was added within 12 hours. To complete the reaction, the reaction mixture was allowed to post-react for 5 hours at 110° C. Volatile compounds were removed in vacuo at 90° C. A light viscous oil (780.0 g) was obtained. $^1$H-NMR in CDCl$_3$ indicated complete conversion.

Example 8 b: EDA+1 EO per mol of NH Functionality+0.25 Caprolactone per mol of NH Functionality In a 3-neck reaction vessel with stirrer, thermometer, dropping funnel and reflux cooler 141.8 g ethylene diamine+1 EO per mol of NH functionality (example 8 a) were placed and heated to 80° C. 68.4 g caprolactone were added in one portion at 80° C. The reaction mixture was heated to 160° C. and was stirred for 8 hours at 160° C. 210.0 g of a orange oil was obtained. 1H-NMR in MeOD indicated 99% conversion of caprolactone.

Example 8 c: EDA+1 EO per mol of NH Functionality+0.25 Caprolactone per mol of NH Functionality+8 PO per mol of NH Functionality In a 2 l autoclave 106.9 g ethylene diamine+1 EO per mol of NH functionality+0.25 caprolactone per mol of NH functionality (example 8 b) and 1.4 g potassium tert. butoxide were placed and the mixture was heated to 140° C. The vessel was purged three times with nitrogen. 567.4 g propylene oxide was added in portions within 12 hours. To complete the reaction, the mixture was allowed to post-react for additional 5 hours at 140° C. The reaction mixture was stripped with nitrogen and volatile compounds were removed in vacuo at 90° C. for 2 hours. 670.0 g of a light brown oil was obtained. Identity was confirmed by $^1$H-NMR in CDCl$_3$.

Example 9

HMDA+1 PO per mol of NH functionality+0.5 Caprolactone per mol of NH functionality+2 EO per mol of NH functionality+8 PO per mol of NH functionality.

(HMDA+1 PO/NH+0.5 Caprolactone/NH+2 EO/NH+8 PO/OH)

In a 2 l autoclave 151.0 g hexamethylene diamine+1 PO per mol of NH functionality+0.5 caprolactone per mol of NH functionality (example 2a) and 1.5 g potassium tert. butoxide were placed and the mixture was heated to 140° C. The vessel was purged three times with nitrogen. 92.2 g ethylene oxide was added within 2 hours. The reaction mixture was stirred for 2 hours at 140° C., then 486.6 g propylene oxide was added within 10 hours. To complete the reaction, the mixture was allowed to post-react for additional 5 hours at 140° C. The reaction mixture was stripped with nitrogen and volatile compounds are removed in vacuo at 90° C. for 2 hours. 720.0 g of a light brown oil was obtained. Identity was confirmed by ¹H-NMR in CDCl₃.

Example 10

EDA+1 PO per mol of NH functionality+0.5 Caprolactone per mol of NH functionality+2 EOper mol NH functionality+8 PO per mol of NH functionality. ( )
(EDA+1 PO/NH+0.5 Caprolactone/NH+2 EO/NH+8 PO/NH)
Example 10 a: EDA+1 PO per mol of NH Functionality+0.5 Caprolactone per mol of NH Functionality In a 3-neck reaction vessel with stirrer, thermometer, dropping funnel, and reflux cooler 251.4 g ethylene diamine+1 PO per mol of NH functionality (Quadrol L, purchased from BASF) and 0.45 g tin(II) 2-ethylhexanoate were placed and heated to 100° C. 196.3 g caprolactone was added within 5 minutes. The reaction mixture was heated to 160° C. and was stirred for 4 hours at 160° C. 377.0 g of an orange viscous oil was obtained. ¹H-NMR in MeOD indicated 97.5% conversion of caprolactone.
Example 10 b: EDA+1 PO per mol of NH Functionality+0.5 Caprolactone per mol of NH Functionality+2 EO per mol NH Functionality+8 PO per mol of NH Functionality In a 2 l autoclave 156.2 g ethylene diamine+1 PO per mol of NH functionality+0.5 caprolactone per mol of NH functionality (example 10 a) and 1.6 g potassium tert. butoxide were placed and the mixture was heated to 140° C. The vessel was purged three times with nitrogen. 105.7 g ethylene oxide was added within 1.5 hours. The reaction mixture was stirred for 2 hours at 140° C., then 557.6 g propylene oxide was added within 12 hours. To complete the reaction, the mixture was allowed to post-react for additional 10 hours at 140° C. The reaction mixture was stripped with nitrogen and volatile compounds were removed in vacuo at 90° C. for 2 hours. 821.0 g of a light brown oil was obtained. Identity was confirmed by ¹H-NMR in CDCl₃.

The following comparative examples have been performed with the shown results obtained (also see Table 5), following the described procedures:

Comparative Example 1

Polyethylene imine, molecular weight 800 g/mole, ethoxylated with 20 mole ethylene oxide per mole of NH-functionality
(PEI800+20 EO/NH), Synthesized as described in WO9532272

Comparative Example 1a

Polyethylene imine, molecular weight 800 g/mole, ethoxylated with 1 mole ethylene oxide per mole of NH-functionality A 5 l autoclave is charged with 1943.0 g of a polyethylenimine with an average molecular weight of 800 g/mol and 97.0 g water. The reactor is purged three times with nitrogen and heated to 110° C. 1789.0 g ethylene oxide is added within 14 hours. To complete the reaction, the reaction mixture is allowed to post-react for 5 hours. Water and volatile compounds are removed in vacuo at 90° C. A highly viscous yellow oil (3688.0 g, water content: 2.6%, pH: 11.05 (5% in water)) is obtained.

Comparative Example 1b

Polyethylene imine, molecular weight 800 g/mole, ethoxylated with 20 mole ethylene oxide per mole of NH-functionality Product similar to comparative example 1 a (144.6 g, 92.7% in water) and 4.34 g potassium hydroxide (50% in water) are placed in a 2 l autoclave. The mixture is heated under vacuum (<10 mbar) to 120° C. and stirred for 2 hours to remove water. The reactor is purged three times with nitrogen and the mixture is heated to 140° C. 1470.7 g ethylene oxide is added within 14 hours. To complete the reaction, the mixture is allowed to post-react for 5 hours. Volatile compounds are removed in vacuo. 1615.0 g of a slightly brown solid were obtained (melting point: 35.4° C.).

Comparative Example 2

HMDA+8 PO per mol of NH functionality
(HMDA+8 PO/NH)
In a 5 l autoclave 672.9 g hexamethylene diamine+1 PO per mol of NH functionality (prepared similar to example 1 a) and 16.0 g potassium hydroxide (50% in water) were placed. The vessel was purged three times with nitrogen and heated to 120° C. Vacuum was applied and the mixture was dewatered for 2 hours at 120° C. and <20 mbar. Vacuum was removed with nitrogen and temperature was increased to 140° C. 3089.9 g propylene oxide was added within 35 hours. To complete the reaction, the mixture was allowed to post-react for additional 10 hours at 140° C. The reaction mixture was stripped with nitrogen and volatile compounds are removed in vacuo at 90° C. for 2 hours. 3370.0 g of a light brown oil was obtained. Identity was confirmed by 1H-NMR in CDCl3.

TABLE 5

| Polymer example | amine/imine | step a) | step b) | step c) | step d) | Polymer structure information |
|---|---|---|---|---|---|---|
| 1 | HMDA | 1 PO | 0.25 Caprolactone | | 8 PO | HMDA + 1 PO/NH + 0.25 Caprolacton/NH + 8 PO/NH |
| 2 | HMDA | 1 PO | 0.50 Caprolactone | | 8 PO | HMDA + 1 PO/NH + 0.5 Caprolacton/NH + 8 PO/NH |
| 3 | EDA | 1 PO | 0.25 Caprolactone | | 8 PO | EDA + 1 PO/NH + 0.25 Caprolactone/NH + 8 PO/NH |
| 4 | HMDA | 1 EO | 0.25 Caprolactone | | 8 PO | HMDA + 1 EO/NH + 0.25 Caprolactone/NH + 8 PO/NH |
| 5 | HMDA | 1 EO | 0.50 Caprolactone | | 8 PO | HMDA + 1 EO/NH + 0.5 Caprolactone/NH + 8 PO/NH |
| 6 | PDA | 1 PO | 0.25 Caprolactone | | 8 PO | PDA + 1 PO/NH + 0.25 Caprolactone/NH + 8 PO/NH |
| 7 | N4 amine | 1 PO | 0.33 Caprolactone | | 10.7 PO | N4 amine + 1 PO/NH + 0.33 Caprolacton/NH + 10.7 PO/NH |
| 8 | EDA | 1 EO | 0.25 Caprolactone | | 8 PO | EDA + 1 EO/NH + 0.25 Caprolacton/NH + 8 PO/NH |

TABLE 5-continued

| Polymer example | amine/ imine | step a) | step b) | step c) | step d) | Polymer structure information |
|---|---|---|---|---|---|---|
| 9 | HMDA | 1 PO | 0.25 Caprolactone | 2 EO | 8 PO | HMDA + 1 PO/NH + 0.5 Caprolactone/NH + 2 EO/NH + 8 PO/OH |
| 10 | EDA | 1 PO | 0.5 Caprolactone | 2 EO | 8 PO | EDA + 1 PO/NH + 0.5 Caprolactone/NH + 2 EO/NH + 8 PO/NH |
| Comp. Ex 1 | PEI(800) | | | 20 EO | | PEI800 + 20 EO/NH |
| Comp. Ex 2 | HMDA | | | 8 PO | | HMDA + 8 PO/NH |

Comp. Ex. = Comparative Example

In the following examples showing application and other test results of certain inventive polymers, whenever "Polymer example(s)" and a number is mentioned, it is meant that the final product, i.e. the "alkoxylated polyamine" resulting is employed.

Polymer Biodegradability

Polymer biodegradation in wastewater was tested in triplicate using the OECD 301F manometric respirometry method. 30 mg/mL test substance is inoculated into wastewater taken from Mannheim Wastewater Treatment Plant and incubated in a closed flask at 25° C. for 28 days. The consumption of oxygen during this time is measured as the change in pressure inside the flask using an OxiTop C (WTW). Evolved $CO_2$ is absorbed using an NaOH solution. The amount of oxygen consumed by the microbial population during biodegradation of the test substance, after correction using a blank, is expressed as a % of the ThOD (Theoretical Oxygen Demand).

The biodegradation data of inventive polymers at 28 day of the OECD 301F test is summarized in Table 6.

TABLE 6

Polymer biodegradability

| polymer example | Amine/ imine | step a) | Step b) | step c) | Bio- degradation % (28 d) |
|---|---|---|---|---|---|
| 1 | HMDA | 1 PO | 0.25 Caprolactone | 8 PO | 59 |
| 3 | EDA | 1 PO | 0.25 Caprolactone | 8 PO | 66 |
| 4 | HMDA | 1 EO | 0.25 Caprolactone | 8 PO | 64 |
| Comparative example 1 | PEI800 | | | 20 EO | <20 |
| Comparative example 2 | HMDA | | | 8 PO | 45 |

Polymer Anti-Redeposition Performance in Laundry Detergents

The following liquid laundry detergent composition (Table 7) was used as base detergent to test polymer anti-redeposition performance. Polymer anti-redeposition performance were tested using the following conditions:

3000 ppm clay, 688 ppm base detergent/25° C./1 mM hardness/19.6 ppm polymer.

TABLE 7

Liquid laundry base detergent for polymer anti-redeposition and cleaning test.

| | Comp (% wt) |
|---|---|
| Linear alkylbenzene sulfonate LAS | 8.9 |
| $C_{10}$-$C_{16}$ Alkyl Sulfate SLS | 7.7 |

TABLE 7-continued

Liquid laundry base detergent for polymer anti-redeposition and cleaning test.

| | Comp (% wt) |
|---|---|
| NI | 7.8 |
| Amine oxide | 0.6 |
| Inventive Polymer | 1 |
| Citric acid | 1.8 |
| Enzymes (combined) | 0.079 |
| Sodium tetraborate | 1.5 |
| Calcium/sodium formate | 0.13 |
| DTPA | 0.5 |
| Brightener | 0.08 |
| Ethanol | 1.7 |
| Propylene glycol | 2.3 |
| Monoethanolamine | 2.65 |
| DETA | 0.05 |
| Sodium cumene sulfonate (NaCS) | 1.3 |
| Aesthetic dye | 0.01 |
| Perfume | 0.6 |
| Antifoam | 0.21 |
| Hueing dye | 0.026 |
| Water & minors | balance |

[a] Fluorescent Brightener is disodium 4,4'-bis{[4-anilino-6-morpholino-s-triazin-2-yl]-amino}-2,2'-stilbenedisulfonate or 2,2'-([1,1'-Biphenyl]-4,4'-diyldi-2,1-ethenediyl)bis-benzenesulfonic acid disodium salt.
[b] 3,5-bis(1,1-dimethylethyl)-4-hydroxybenzenepropanoic acid, methyl ester [6386-38-5]
[c] Dow Corning supplied antifoam blend 80-92% ethylmethyl, methyl(2-phenyl propyl) siloxane; 5-14% MQ Resin in octyl stearate a 3-7% modified silica.

Test Preparation

The following fabrics are provided for the whiteness benefit test:

NA Polyester: PW19, available from Empirical Manufacturing Company (Cincinnati, OH, Knitted Cotton 1: Test fabrics, Inc 403 cotton interlock knit tubular CW120, available from Empirical Manufacturing Company (Cincinnati, OH, USA).

Polycotton

"Washed and FE Treated" fabrics were prepared according to the following method: 400 g fabrics are washed in a WE Miniwasher Electrolux EWC1350 (3.5 litre water) twice using the short program (45-minute wash cycle followed by three rinse cycles; total program is 90 minutes) at 60° C. with 18.6 g Ariel™ Compact powder detergent, twice using the short program, at 60° C. nil detergent, and then three times using the short program at 40° C. with 8.2 g Lenor™ Concentrate (a fabric enhancer) into each main wash. Fabrics are then dried in a tumble dryer on extra dry until dry.

"Washed" fabrics were prepared according to the following method: 400 g fabrics are washed in a WE Miniwasher Electrolux EWC 1350 (3.5 litre water) twice using the short program (45-minute wash cycle followed by three rinse cycles; total program is 90 minutes) at 60° C. with 18.6 g Ariel™ Compact powder detergent and twice using the short program, at 60° C. nil detergent. Fabrics are then dried in a tumble dryer on extra dry until dry.

Test Method

Four fabric samples are prepared: Polycotton, washed; Knitted Cotton, washed; NA Polyester washed and FE treated, Knitted cotton washed and FE treated. Each sample is run in a 96 well plate simulated washing system that uses magnetized bearings to simulate the agitation of a typical full scale washing machine according to the following conditions: 750 ppm detergent concentration, 150 μL water per well, 25° C., water hardness of 1.0 mM (2:1 Ca+2:Mg+2 molar ratio), wash pH of 8.3, 3000 ppm Arizona test dust (supplied by PTI, Powder Technology Inc).

Each fabric is washed for 60 minutes and dried in the dark under ambient conditions. For each wash condition, there are two 96 well plates, and eight internal replicates per 96 well plate, for a total of 16 replicates per wash condition. When the samples are dry, L*, a*, b* and CIE WI are measured on each 96 well plate spot using a Spectrolino imaging system (Gretag Macbeth, Spectro Scan 3.273). For each treatment, the average CIE WI is determined. Delta CIE WI, as reported in Table below, is the difference of the average CIE WI of the sample vs. the average CIE WI of a control sample without the tested polymer.

For the whiteness index, the CIE whiteness index formula was used and delta WI was calculated as follows: delta WI on a substrate=WI technology−WI nil.

The results are shown in Table 8, inventive polymers can deliver clear anti-redeposition performance.

To evaluate the primary detergency of different stains, different soiled fabrics were determined before and after washing using soil removal index (SRI) formula from ASTM D4265. For obtaining the reflectance values for the respective fabric both before and after washing using a Spectrolino imaging system (Gretag Macbeth, Spectro Scan 3.273), an average of 6 different measuring points were taken each before and after washing. Higher delta reflectance values demonstrate a better primary detergency.

ASTM D4265-14: Evaluation of Stain Removal Performance in Home Laundry

Stain Removal Index=SRI

SRI=100×(((delta E*(before wash−unstained)−delta E*(after wash−unstained)/delta E*(before wash−unstained)))

delta E*=((delat L*)$^2$+(delta a*)$^2$+(delta b*)$^2$)$^{1/2}$

Average delta SRI=(sum delta SRI all stains)/number of stains

The cleaning performance of inventive polymers is summarized in Table 9. Inventive polymers can deliver clear improvement on stain removal, especially on stains that contain sebum (PCS94, WFK 20D and PCS132).

TABLE 8

Polymer anti-redeposition performance

| Polymer Example | Add. ppm | Polycotton washed | NA Polyester washed and FE treated | cotton washed and FE treated | cotton washed | Average |
|---|---|---|---|---|---|---|
| Nil polymer |  | ref | ref | ref | ref | ref |
| 1 | 19.6 | 7.7 | 5.1 | 9.0 | 5.6 | 6.9 |
| 2 | 19.6 | 7.9 | 6.3 | 10.5 | 7.0 | 7.9 |
| 3 | 19.6 | 7.2 | 6.2 | 11.6 | 6.1 | 7.8 |
| 4 | 19.6 | 10.0 | 6.7 | 11.0 | 7.9 | 8.9 |
| 5 | 19.6 | 6.4 | 5.8 | 9.6 | 6.5 | 7.1 |
| 6 | 19.6 | 6.8 | 5.2 | 9.6 | 5.4 | 6.8 |
| 7 | 19.6 | 10.3 | 5.6 | 12.3 | 6.7 | 8.7 |

Polymer Cleaning Performance in Laundry Detergent

Polymer cleaning performance in laundry detergent were carried out with the formulation stated Table 7 and the washing conditions for single wash cycle performance may be summarized as follows:

Machine: Launder-o-meter
Washing liquor 500 mL
Washing time 30 minutes
Washing temperature 25° C.
Detergent concentration 0.688 g/L
Water hardness 1 mmol/L; (Ca:Mg):HCO3 (4:1):8
Ballast: white cotton fabric (Cotton interlock knit tubular from CFT) 7×21 cm
Soiled fabrics: PC-S 94, WFK 20D, PC-S 132 from CFT After the one cycle, soiled fabrics were twice rinsed with water, followed by shortly spin-drying and drying at room temperature over a period of 12 hours.

TABLE 9

Polymer cleaning performance.

| Polymer Example used as additive | Additive ppm | Delta SRI | | | Average delta SRI |
|---|---|---|---|---|---|
| | | PCS 94 | WFK20D | PCS132 | |
| 1 | 19.6 | 7.0 | 6.3 | 4.0 | 5.8 |
| 2 | 19.6 | 5.1 | 3.6 | 4.9 | 4.5 |
| 3 | 19.6 | 6.1 | 7.7 | 2.3 | 5.3 |
| 4 | 19.6 | 7.3 | 6.3 | 5.9 | 6.5 |
| 5 | 19.6 | 6.0 | 5.6 | 4.6 | 5.4 |
| 6 | 19.6 | 6.9 | 6.7 | 4.3 | 6.0 |
| 7 | 19.6 | 6.2 | 7.2 | 3.6 | 5.7 |

Polymer Whiteness Performance

Whiteness maintenance, also referred to as whiteness preservation, is the ability of a detergent to keep white items from whiteness loss when they are washed in the presence of soils. White garments can become dirty/dingy looking over time when soils are removed from dirty clothes and suspended in the wash water, then these soils can re-deposit onto clothing, making the clothing less white each time they are washed.

The whiteness benefit of polymers of the present disclosure is evaluated using automatic Tergotometer with 10 pots for laundry formulation testing.

SBL2004 test soil strips supplied by WFK Testgewebe GmbH are used to simulate consumer soil levels (mix of body soil, food, dirt etc.). On average, every 1 SBL2004 strip is loaded with 8 g soil. The SBL2004 test soil strips were cut into 5×5 cm squares for use in the test.

Additionally Black Todd clay is used to stress the system further. The clay is added at 0.25 g per 1 L wash solution. The soil is supplied by Warwick Equest Ltd.

White Fabric swatches of Table 10 below purchased from WFK Testgewebe GmbH are used as whiteness tracers.

TABLE 10

| Code | Fiber Content | % Fiber Content | Fabric Construction | Size | WFK Code |
|---|---|---|---|---|---|
| CK | Cotton | 100 | Weft Knit | (5 × 5 cm) | 19502_5 × 5_stamped |
| PC | Polyester/cotton | 65/35 | Weave | (5 × 5 cm) | 19503_5 × 5_stamped |
| PE | Polyester | 100 | Weft Knit | (5 × 5 cm) | 19508_5 × 5_stamped |
| PS | Polyester/Spandex ™ | 95/5 | Weft Knit | (5 × 5 cm) | 19507_5 × 5_stamped |

Additional ballast (background fabric swatches) is also used to simulate a fabric load and provide mechanical energy during the real laundry process. Ballast loads are comprised of cotton and polycotton knit swatches at 5×5 cm size.

4 cycles of wash are needed to complete the test:

Cycle 1: Desired amount of detergent is fully dissolved by mixing with 1 L water (at defined hardness) in each tergotometer port. Also, at this point 0.25 g of Black Todd clay is added. 60 grams of fabrics, including whiteness tracers (4 types, each with 4 replicates), 10 pieces 5×5 cm SBL2004 and ballast are washed and rinsed in the tergotometer pot under defined conditions.

In the test of water-soluble unit dose composition, wash concentration is 2000 ppm. The wash temperature is 30° C., water hardness is 7 gpg.

Cycle 2: The whiteness tracers and ballast from each pot are then washed and rinsed again together with a new set of SBL2004 (5×5 cm, 10 pieces) follow the process of cycle 1. All other conditions remain same as cycle 1.

Cycle 3: The whiteness tracers and ballast from each pot are then washed and rinsed again together with a new set of SBL2004 (5×5 cm, 10 pieces) follow the process of cycle 1. All other conditions remain same as cycle 1.

Cycle 4: The whiteness tracers and ballast from each port are then washed and rinsed again together with a new set of SBL2004 (5×5 cm, 10 pieces) follow the process of cycle 1. All other conditions remain same as cycle 1.

After Cycle 4, all whiteness tracers & ballast are flat dried until dry, the tracers are then measured using Konica Minolta CM-3610D spectrophotometer. The Whiteness Index (WI(CIE)) is part of the Konica Minolta report.

Liquid detergent composition E and F below are prepared by traditional means known to those of ordinary skill in the art by mixing the listed ingredients (Table 11).

The whiteness maintenance of the inventive and comparative polymers is evaluated according to the method for evaluating whiteness performance of polymers by directly comparing the whiteness performance of reference composition E and test composition F. $\Delta WI(CIE)$ of composition F vs composition E is reported in bottom Table 11 as an indication of polymer whiteness performance benefit. Inventive polymer can deliver strong whiteness benefit.

TABLE 11

|  | Comp. E % wt | Comp. F % wt |
|---|---|---|
| Linear alkylbenzene sulfonate LAS | 8.9 | 8.9 |
| $C_{10}$-$C_{16}$ Alkyl Sulfate SLS | 7.7 | 7.7 |
| NI | 7.8 | 7.8 |
| Amine oxide | 0.6 | 0.6 |
| Inventive Polymer | 0 | 2.86 |
| Citric acid | 1.8 | 1.8 |
| Enzymes (combined) | 0.079 | 0.079 |
| Sodium tetraborate | 1.5 | 1.5 |
| Calcium/sodium formate | 0.13 | 0.13 |
| DTPA | 0.5 | 0.5 |

TABLE 11-continued

|  | Comp. E % wt | Comp. F % wt |
|---|---|---|
| Brightener | 0.08 | 0.08 |
| Ethanol | 1.7 | 1.7 |
| Propylene glycol | 2.3 | 2.3 |
| Monoethanolamine | 2.65 | 2.65 |
| DETA | 0.05 | 0.05 |
| Sodium cumene sulfonate (NaCS) | 1.3 | 1.3 |
| Aesthetic dye | 0.01 | 0.01 |
| Perfume | 0.6 | 0.6 |
| Antifoam | 0.21 | 0.21 |
| Hueing dye | 0.026 | 0.026 |
| Water & minors | balance | balance |

TABLE 12

Whiteness maintenance performance of novel polymers and non-inventive polymer.

| Inventive Polymer | $\Delta WI(CIE)$ vs Reference (PC: 65:35 polycotton) | $\Delta WI(CIE)$ vs Reference (PE) |
|---|---|---|
| 1 | 1.37 | 3.18 |
| 2 | 0.91 | 1.65 |
| 3 | 1.06 | 2.18 |
| 4 | 4.49 | 2.87 |
| 5 | 3.88 | 4.24 |

Polymer Suds Mileage Performance in Hand Dish Detergent

Polymer suds mileage performance were evaluated using the following method for evaluating suds mileage of hand dish composition:

The objective of the Suds Mileage Index test is to compare the evolution over time of suds volume generated for different test formulations at specified water hardness, solution temperatures and formulation concentrations, while under the influence of periodic soil injections. Data are compared and expressed versus a reference composition as a suds mileage index (reference composition has suds mileage index of 100). The steps of the method are as follows:

1) A defined amount of a test composition, depending on the targeted composition concentration (0.12 wt %), is dispensed through a plastic pipette at a flow rate of 0.67 mL/sec at a height of 37 cm above the bottom surface of a sink (dimension: 300 mm diameter and 288 mm height) into a water stream (water hardness: 2 gpg, water temperature:35° C.) that is filling up the sink to 4 L with a constant pressure of 4 bar.
2) An initial suds volume generated (measured as average foam height X sink surface area and expressed in cm$^3$) is recorded immediately after end of filling.
3) A fixed amount (6 mL) of soil is immediately injected into the middle of the sink.
4) The resultant solution is mixed with a metal blade (10 cm×5 cm) positioned in the middle of the sink at the air liquid interface under an angle of 45 degrees rotating at 85 RPM for 20 revolutions.
5) Another measurement of the total suds volume is recorded immediately after end of blade rotation.
6) Steps 3-5 are repeated until the measured total suds volume reaches a minimum level of 400 cm$^3$. The amount of added soil that is needed to get to the 400 cm$^3$ level is considered as the suds mileage for the test composition.
7) Each test composition is tested 4 times per testing condition (i.e., water temperature, composition concentration, water hardness, soil type).
8) The average suds mileage is calculated as the average of the 4 replicates for each sample.
9) Calculate a Suds Mileage Index by comparing the average mileage of a test composition sample versus a reference composition sample. The calculation is as follows:

$$\text{Suds Mileage Index} = \frac{\text{Average number of soil } additioin \text{ of test composition}}{\text{Average number of soil addition of reference composition}} \times 100$$

Soil composition is produced through standard mixing of the components described in Table 13.

TABLE 13

| Greasy Soil | |
| --- | --- |
| Ingredient | Weight % |
| Crisco Oil | 12.730 |
| Crisco shortening | 27.752 |
| Lard | 7.638 |
| Refined Rendered Edible Beef Tallow | 51.684 |
| Oleic Acid, 90% (Techn) | 0.139 |
| Palmitic Acid, 99+% | 0.036 |
| Stearic Acid, 99+% | 0.021 |

Polymer Performance in Hand Dish Detergent

Hand dish detergent composition below are prepared by traditional means known to those of ordinary skill in the art by mixing the listed ingredients. The impact of inventive polymers on suds mileage are evaluated by comparing the suds mileage of formulation A (Reference) and B (Reference with inventive polymers) in Table 14. The suds mileage performance is evaluated using method for evaluating suds mileage of hand dish compositions described herein, and Suds Mileage Index is reported in Table 15.

TABLE 14

| Ingredient | A (Reference composition) % by weight of the composition | B (Test composition: Reference with inventive polymers) % by weight of the composition |
| --- | --- | --- |
| NaCl | 0.9 | 0.9 |
| Polypropylene glycol (mw 2000) | 0.809 | 0.809 |
| Ethanol | 1.7 | 1.7 |
| mixture of 2-methylcyclohexane-1,3-diamine, 4-methylcyclohexane-1,3-diamine | 0.23% | 0.23% |
| Magnesium sulfate heptahydrate | 0.04286 | 0.04286 |
| C12-13 AE0.6S anionic surfactant | 18.61 | 18.61 |
| C12-14 dimethyl amine oxide | 6.65 | 6.65 |
| BIT | 0.0045 | 0.0045 |
| Phenoxyethanol | 0.08 | 0.08 |
| Perfume | 0.195 | 0.195 |
| Yellow Dye | 0.004 | 0.004 |
| Blue Dye | 0.00165 | 0.00165 |
| Inventive Polymer | 0 | 2 |
| Water | Balance | Balance |
| NaOH | trim to pH 9.0* | trim to pH 9.0* |

*measured as a 10 w/w % product dilution in demineralized water at 22° C.

As indicated in Table 15, inventive polymers can deliver clear suds mileage benefit.

TABLE 15

| Polymer performance in hand dish detergent | |
| --- | --- |
| Inventive Polymer | Suds mileage index vs A (Ref) |
| 1 | 110 |
| 4 | 120 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A cleaning composition comprising:
   a) an alkoxylated polyamine comprising a structural unit derived from a polyamine according to general formula (I)

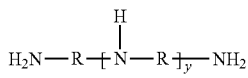

(I)

in which the variables are each defined as follows:
R represents identical or different,
   i) linear or branched $C_2$-$C_{12}$ alkylene radicals or
   ii) an etheralkyl unit of the following formula (III):

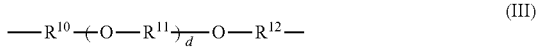

(III)

in which the variables are each defined as follows:
   $R^{10}$, $R^{11}$, $R^{12}$ represent identical or different, linear or branched $C_2$-$C_6$-alkylene radicals and
   d is an integer having a value in the range of about 0 to about 50 or
   iii) $C_5$-$C_{10}$ cycloalkylene radicals optionally substituted with at least one $C_1$-$C_3$ alkyl;
y is an integer having a value in the range of about 0 to about 8;
wherein the alkoxylated polyamine comprises at least one residue according to general formula (IIa)

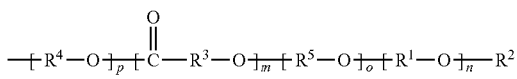

(IIa)

in which the variables are each defined as follows:
$R^1$ represents $C_2$-$C_{22}$-(1,2-alkylene) radicals;
$R^2$ represents hydrogen and/or $C_1$-$C_{22}$-alkyl and/or $C_7$-$C_{22}$-aralkyl;
$R^3$ represents linear or branched $C_1$-$C_{22}$-alkylene radicals;
$R^4$ represents $C_2$-$C_{22}$-(1,2-alkylene) radicals;
$R^5$ represents 1,2-ethylene;
m is an integer having a value of at least about 1 and up to about 10;
n is an integer having a value of at least about 1 and up to about 25;
o is an integer having a value of from 0 and up to 25;
p is an integer having a value of at least about 1 and up to about 5;
with the proviso that the sum of n+o+p is at most about 25,
wherein at least about 50 weight percent of the total amount of moieties the residues $R^1$, $R^4$ in the alkoxylated polyamine originates from $C_3$ and/or $C_4$-alkylene oxides,
and—when o is not zero—then $R^1$ and $R^5$ are selected such that the moieties containing $R^1$ and $R^5$ are of different chemical composition and/or different chemical structure such that there are different arrangements of the alkylene oxides if more than one alkylene oxide is selected for $R^1$ and $R^5$ and the selected alkylene oxides are the same for both $R^1$ and $R^5$; and
b) a surfactant.

2. The cleaning composition of claim 1, containing at least one residue according to general formula (IIb)

(IIb)

in which the variables are each defined as follows:
$R^1$ represents $C_2$-$C_{22}$-(1,2-alkylene) radicals;
$R^2$ represents hydrogen and/or $C_1$-$C_{22}$-alkyl and/or $C_7$-$C_{22}$-aralkyl;
$R^3$ represents linear or branched $C_1$-$C_{22}$-alkylene radicals;
$R^5$ represents 1,2-ethylene;
m is an integer having a value of about 1 up to about 10;
n is an integer having a value of about 1 and up to about 25;
o is an integer having a value of from 0 and up to 25;
wherein at least about 50 weight percent of the total amount of moieties in residues $R^1$ and—when residues of the formula (IIa) are also present—also $R^4$, in the alkoxylated polyamine originates from $C_3$ and/or $C_4$-alkylene oxides,
wherein $R^1$ and $R^5$ are selected such that the moieties containing $R^1$ and $R^5$ are of different chemical composition and/or different chemical structure such that there are different arrangements of the alkylene oxides if more than one alkylene oxide is selected for $R^1$ and $R^5$ and the selected alkylene oxides are the same for both $R^1$ and $R^5$,
with the proviso that the sum of n+o is at most about 25.

3. The cleaning composition of claim 2, wherein the sum of n+o is at most about 15.

4. The cleaning composition of claim 1, wherein the alkoxylated polyamine comprises at least one residue according to general formula (IIc)

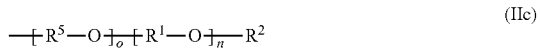

(IIc)

in which the variables are defined as follows:
$R^1$ represents $C_2$-$C_{22}$-(1,2-alkylene) radicals;
$R^2$ represents hydrogen and/or $C_1$-$C_{22}$-alkyl;
$R^5$ represents 1,2-ethylene;
n is an integer having a value of at least about 5 and up to about 100;
o is an integer having a value of from 0 and up to 100;
wherein at least about 50 weight percent of the total amount of moieties in the alkoxylated polyamine stemming from alkylene oxides such that the residues R1 and—when residues of the formula IIa are also present—also R4 originates from C3 and/or C4-alkylene oxides,
with the proviso that the sum of n+o is at most about 25.

5. The cleaning composition of claim 4, wherein n is an integer of up to about 15.

6. The cleaning composition of claim 1, wherein
R represents identical or different, linear or branched $C_2$-$C_{12}$-alkylene radicals or an etheralkyl unit according to formula (III), wherein d is from about 1 to about 10, and
$R^{10}$, $R^{11}$, $R^{12}$ are independently selected from linear or branched $C_3$ to $C_4$ alkylene radicals.

7. The cleaning composition of claim 1, wherein the alkoxylated polyamine comprises at least one residue according to general formula (IIb)

$$-\!\!\left[\!\!\begin{array}{c}O\\\|\\C\end{array}\!\!-R^3-O\right]_{\!m}\!\!\left[R^5-O\right]_{\!o}\!\!\left[R^1-O\right]_{\!n}\!\!R^2 \quad\text{(IIb)}$$

in which the variables are each defined as follows:
$R^1$ represents $C_2$-$C_{22}$-(1,2-alkylene) radicals;
$R^2$ represents hydrogen and/or $C_1$-$C_{22}$-alkyl and/or $C_7$-$C_{22}$-aralkyl;
$R^3$ represents linear or branched $C_1$-$C_{22}$-alkylene radicals;
$R^5$ represents 1,2-ethylene;
m is an integer having a value of about 1 up to about 10;
n is an integer having a value of about 1 and up to about 25;
o is an integer having a value of from 0 and up to 25;
wherein at least about 50 weight percent of the total amount of moieties in residues R1 and—when residues of the formula (IIa) are also present—also $R^4$, in the alkoxylated polyamine originates from C3 and/or C4-alkylene oxides,
wherein $R^1$ and $R^5$ are selected such that the moieties containing $R^1$ and $R^5$ are of different chemical composition and/or different chemical structure such that there are different arrangements of the alkylene oxides if more than one alkylene oxide is selected for $R^1$ and $R^5$ and the selected alkylene oxides are the same for both $R^1$ and $R^5$,
with the proviso that the sum of n+o is at most about 25;
wherein the alkoxylated polyamine further contains at least one residue according to general formula (IIc)

$$-\!\!\left[R^5-O\right]_{\!o}\!\!\left[R^1-O\right]_{\!n}\!\!R^2 \quad\text{(IIc)}$$

in which the variables are defined as follows:
$R^1$ represents $C_2$-$C_{22}$-(1,2-alkylene) radicals;
$R^2$ represents hydrogen and/or $C_1$-$C_{22}$-alkyl;
$R^5$ represents 1,2-ethylene;
n is an integer having a value of at least about 5 and up to about 100;
o is an integer having a value of from 0 and up to 100;
wherein at least about 50 weight percent of the total amount of moieties in the alkoxylated polyamine stemming from alkylene oxides such that the residues R1 and—when residues of the formula IIa are also present—also R4 originates from C3 and/or C4-alkylene oxides,
with the proviso that the sum of n+o is at most about 25; and
wherein the residue (IIa) accounts for at least about 80 weight percent of all residues (IIa), (IIb) and (IIc) attached to the amino-groups of the polyamine.

8. The cleaning composition of claim 7, wherein residue (IIa) accounts for about 95 weight percent or more of all residues (IIa), (IIb) and (IIc) attached to the amino-groups of the polyamine.

9. The cleaning composition of claim 1, wherein y is up to about 6.

10. The cleaning composition of claim 1, wherein y is up to about 2.

11. The cleaning composition of claim 1, wherein R represents identical or different:
ia) $C_2$-$C_6$-alkylene radicals being selected from ethylene, propylene and hexamethylene; or
iib) $C_5$-$C_{10}$-cycloalkylene radicals optionally substituted with at least one $C_1$-$C_3$-alkyl.

12. The cleaning composition of claim 1, wherein o is 0.

13. A cleaning composition comprising an alkoxylated polyamine comprising a structural unit according to general formula (I)

$$\begin{array}{c}\diagdown\\N\diagup\end{array}\!\!-R\!\!\left[\!\!-N-R\right]_{\!y}\!\!-N\!\!\begin{array}{c}\diagup\\\diagdown\end{array} \quad\text{(I)}$$

in which the variables are each defined as follows:
R represents identical or different,
  i) linear or branched $C_2$-$C_{12}$-alkylene radicals or
  ii) an etheralkyl unit of the following formula (III):

$$-R^{10}\!\!-\!\!\left(O-R^{11}\right)_{\!d}\!\!-O-R^{12}- \quad\text{(III)}$$

in which the variables are each defined as follows:
$R^{10}$, $R^{11}$, $R^{12}$ represent identical or different, linear or branched $C_2$-$C_6$-alkylene radicals and
d is an integer having a value in the range of about 0 to about 50 or
iii) $C_5$-$C_{10}$ cycloalkylene radicals optionally substituted with at least one $C_1$-$C_3$ alkyl;
y is an integer having a value in the range of about 0 to about 8;
wherein the alkoxylated polyamine comprises at least one residue according to general formula (IIa)

$$-\!\!\left[R^4-O\right]_{\!p}\!\!\left[\!\!\begin{array}{c}O\\\|\\C\end{array}\!\!-R^3-O\right]_{\!m}\!\!\left[R^5-O\right]_{\!o}\!\!\left[R^1-O\right]_{\!n}\!\!R^2 \quad\text{(IIa)}$$

in which the variables are each defined as follows:
$R^1$ represents $C_2$-$C_{22}$-(1,2-alkylene) radicals;
$R^2$ represents hydrogen and/or $C_1$-$C_{22}$-alkyl and/or $C_7$-$C_{22}$-aralkyl;
$R^3$ represents linear or branched $C_1$-$C_{22}$-alkylene radicals;
$R^4$ represents $C_2$-$C_{22}$-(1,2-alkylene) radicals;
$R^5$ represents 1,2-ethylene;
m is an integer having a value of at least about 1 and up to about 10;
n is an integer having a value of at least about 1 and up to about 25;
o is an integer having a value of from 0 and up to 25;
p is an integer having a value of at least about 1 and up to about 5;
with the proviso that the sum of n+o+p is at most about 25,
wherein at least about 50 weight percent of the total amount of moieties the residues $R^1$, $R^4$ in the alkoxylated polyamine originates from C3 and/or C4-alkylene oxides, and—when o is not zero—then $R^1$ and $R^5$ are selected such that the moieties containing R1 and $R^5$ are of different chemical composition and/or different chemical structure such that there are different arrangements of the alkylene oxides if more than one alkylene oxide is selected for $R^1$ and $R^5$ and the selected alkylene oxides are the same for both $R^1$ and $R^5$.

14. The cleaning composition of claim 13, wherein y is an integer having a value in the range of about 0 to about 4.

15. The cleaning composition of claim 13, wherein R represents identical or different,
   ia) $C_2$-$C_6$-alkylene radicals being selected from ethylene, propylene and hexamethylene, or
   iib) $C_5$-$C_{10}$-cycloalkylene radicals optionally substituted with at least one $C_1$-$C_3$-alkyl.

16. The cleaning composition of claim 15, wherein iib) is at least one $C_6$-$C_7$-cycloalkylene radical substituted with at least one methyl or ethyl.

17. The cleaning composition of claim 15, wherein R is selected only from group ia).

18. The cleaning composition of claim 13, wherein n+o+p is at most about 15.

19. The cleaning composition of claim 13, wherein n is an integer of up to about 15.

20. The cleaning composition of claim 13, wherein o is 0.

* * * * *